US009745467B2

(12) United States Patent
Mulholland et al.

(10) Patent No.: US 9,745,467 B2
(45) Date of Patent: Aug. 29, 2017

(54) IMPACT MODIFIED POLYOXYMETHYLENE COMPOSITION AND ARTICLES MADE THEREFROM THAT ARE STABLE WHEN EXPOSED TO ULTRAVIOLET LIGHT

(71) Applicant: Ticona LLC, Florence, KY (US)

(72) Inventors: Bruce Mulholland, Hebron, KY (US); Ursula Ziegler, Mainz-Kostheim (DE)

(73) Assignee: Ticona, LLC, Florence, KY (US)

( * ) Notice: Subject to any disclaimer, the term of this patent is extended or adjusted under 35 U.S.C. 154(b) by 85 days.

(21) Appl. No.: 14/135,699

(22) Filed: Dec. 20, 2013

(65) Prior Publication Data
US 2014/0187682 A1    Jul. 3, 2014

Related U.S. Application Data

(60) Provisional application No. 61/789,023, filed on Mar. 15, 2013, provisional application No. 61/746,458, filed on Dec. 27, 2012.

(51) Int. Cl.
C08L 71/02    (2006.01)
C08K 3/00     (2006.01)
C08K 5/00     (2006.01)
C08L 59/02    (2006.01)
C08L 59/04    (2006.01)

(52) U.S. Cl.
CPC ............ C08L 71/02 (2013.01); C08K 3/0033 (2013.01); C08K 5/005 (2013.01); C08K 5/0041 (2013.01); C08L 59/02 (2013.01); C08L 59/04 (2013.01); C08L 2201/08 (2013.01)

(58) Field of Classification Search
CPC .......... C08L 71/02; C08L 59/02; C08L 59/04; C08L 2201/08; C08K 3/0033; C08K 5/0041; C08K 5/005; C08K 3/0041
See application file for complete search history.

(56) References Cited

U.S. PATENT DOCUMENTS

| | | |
|---|---|---|
| 2,993,025 A | 7/1961 | Alsup et al. |
| 3,161,616 A | 12/1964 | Brown et al. |
| 3,161,617 A | 12/1964 | Kritzler et al. |
| 3,269,988 A | 8/1966 | Braude et al. |
| 3,340,234 A | 9/1967 | Brown et al. |
| 3,346,663 A | 10/1967 | Kern et al. |
| 3,380,966 A | 4/1968 | Fouts |
| 3,393,179 A | 7/1968 | Leverett et al. |
| 3,642,940 A | 2/1972 | Burg et al. |
| 3,865,284 A | 2/1975 | Kazama et al. |
| 3,998,791 A | 12/1976 | Radici et al. |
| 4,097,453 A | 6/1978 | Radici et al. |
| 4,111,912 A | 9/1978 | Sextro et al. |
| 4,169,867 A | 10/1979 | Burg et al. |
| 4,195,158 A | 3/1980 | Burg et al. |
| 4,431,794 A | 2/1984 | Sadlowski et al. |
| 4,493,751 A | 1/1985 | Cherdron et al. |
| 4,517,319 A | 5/1985 | Reske et al. |
| 4,640,949 A | 2/1987 | Wagman |
| 4,683,267 A | 7/1987 | Lindner et al. |
| 4,689,373 A | 8/1987 | Auerbach et al. |
| 4,780,498 A | 10/1988 | Goerrissen et al. |
| 4,795,477 A | 1/1989 | Kusumgar et al. |
| 4,804,716 A | 2/1989 | Flexman, Jr. |
| 4,828,755 A | 5/1989 | Kusumgar et al. |
| 4,845,161 A | 7/1989 | Richardson |
| 4,929,712 A | 5/1990 | Sugiyama et al. |
| 4,950,773 A | 8/1990 | Monnier et al. |
| 4,968,756 A | 11/1990 | Silvis et al. |
| 4,975,518 A | 12/1990 | Broussard et al. |
| 4,975,519 A | 12/1990 | Yang et al. |
| 4,978,725 A | 12/1990 | Reske et al. |
| 4,996,253 A | 2/1991 | Mulholland |
| 5,004,784 A | 4/1991 | Huynh-Ba |
| 5,004,798 A | 4/1991 | Broussard et al. |
| 5,039,741 A | 8/1991 | Burg |
| 5,043,398 A | 8/1991 | Auerbach et al. |
| 5,143,982 A | 9/1992 | Niino |
| 5,144,005 A | 9/1992 | Sextro et al. |

(Continued)

FOREIGN PATENT DOCUMENTS

| | | |
|---|---|---|
| AU | 2148770 | 4/1972 |
| DE | 2 263 300 A1 | 7/1974 |

(Continued)

OTHER PUBLICATIONS

Search Report and Written Opinion for Application No. PCT/US2013/076801 dated Apr. 16, 2014.
Co-pending U.S. Appl. No. 12/423,671, Klaus Kurz, et al., filed Apr. 14, 2009.
Co-pending U.S. Appl. No. 12/904,575, Lowell Larson, filed Oct. 14, 2010.
Co-pending U.S. Appl. No. 13/631,072, Lowell Larson, filed Sep. 28, 2012.
Co-pending U.S. Appl. No. 13/721,268, Malvika Bihari, filed Dec. 20, 2012.

(Continued)

Primary Examiner — Vickey Nerangis
(74) Attorney, Agent, or Firm — Dority & Manning, P.A.

(57) ABSTRACT

A polymer composition is disclosed containing a coupling agent and an impact modifier that renders the composition resistant to ultraviolet light degradation. The polymer composition contains an aliphatic coupling agent, an aliphatic impact modifier, or both an aliphatic coupling agent and an aliphatic impact modifier. The polymer composition is well suited to producing molded articles, especially articles that will later be exposed to substantial amounts of ultraviolet light. For example, molded articles made according to the present disclosure are well suited for use on the interior of vehicles where the parts are not only exposed to ultraviolet light, but are also exposed to repeated thermal cycles.

22 Claims, 10 Drawing Sheets

(56) References Cited

U.S. PATENT DOCUMENTS

| | | | |
|---|---|---|---|
| 5,173,532 A | 12/1992 | Endo et al. | |
| 5,183,860 A | 2/1993 | Kashihara | |
| 5,206,308 A | 4/1993 | Auerbach et al. | |
| 5,286,807 A | 2/1994 | Flexman, Jr. | |
| 5,288,840 A | 2/1994 | Morishita et al. | |
| 5,292,824 A | 3/1994 | Nagai et al. | |
| 5,310,822 A | 5/1994 | Kielhorn-Bayer et al. | |
| 5,326,846 A | 7/1994 | Nagai et al. | |
| 5,364,900 A * | 11/1994 | Hata | C08K 3/0041 524/291 |
| 5,380,724 A | 1/1995 | Zubovics et al. | |
| 5,530,061 A | 6/1996 | Sanada et al. | |
| 5,541,284 A | 7/1996 | Arnoldi et al. | |
| 5,587,449 A | 12/1996 | Fleischer et al. | |
| 5,599,860 A | 2/1997 | Memon et al. | |
| 5,608,030 A | 3/1997 | Hoffmockel et al. | |
| 5,834,542 A | 11/1998 | Kielhorn-Bayer et al. | |
| 5,837,744 A | 11/1998 | Nagashima et al. | |
| 5,852,135 A | 12/1998 | Kanai et al. | |
| 5,859,131 A | 1/1999 | Ishiura et al. | |
| 5,866,670 A | 2/1999 | Nakai et al. | |
| 5,910,540 A | 6/1999 | Takahashi | |
| 5,919,849 A | 7/1999 | Memon et al. | |
| 5,942,593 A | 8/1999 | Pudleiner et al. | |
| 5,959,036 A | 9/1999 | Yahiro et al. | |
| 5,962,623 A | 10/1999 | Eckardt et al. | |
| 6,187,859 B1 | 2/2001 | Humphrey et al. | |
| 6,271,302 B1 | 8/2001 | Matsushima | |
| 6,312,828 B1 | 11/2001 | Akao | |
| 6,388,049 B1 | 5/2002 | Yokoyama et al. | |
| 6,433,106 B1 | 8/2002 | Mori et al. | |
| 6,441,056 B2 | 8/2002 | Keller | |
| 6,489,388 B1 | 12/2002 | Kurz et al. | |
| 6,506,850 B1 | 1/2003 | Tamimura et al. | |
| 6,512,047 B2 | 1/2003 | Kim et al. | |
| 6,559,266 B2 | 5/2003 | Kaufhold et al. | |
| 6,706,807 B2 | 3/2004 | Kaufhold et al. | |
| 6,821,630 B2 | 11/2004 | Takada et al. | |
| 6,872,775 B2 | 3/2005 | Greulich et al. | |
| 6,936,651 B2 | 8/2005 | Flexman et al. | |
| 6,969,651 B1 | 11/2005 | Lu et al. | |
| 7,008,986 B2 | 3/2006 | Dames et al. | |
| 7,041,718 B2 | 5/2006 | Harashina et al. | |
| 7,138,175 B2 | 11/2006 | Saito | |
| 7,169,887 B2 | 1/2007 | Papke | |
| 7,223,809 B2 | 5/2007 | Notorgiacomo | |
| 7,329,695 B2 | 2/2008 | Tucker et al. | |
| 7,618,714 B2 | 11/2009 | Ziegler et al. | |
| 7,644,657 B1 | 1/2010 | Clark et al. | |
| 7,645,822 B2 | 1/2010 | Assmann et al. | |
| 7,745,548 B2 | 6/2010 | Zierer et al. | |
| 7,812,110 B2 | 10/2010 | Haubs et al. | |
| 7,829,610 B2 | 11/2010 | Papke | |
| 7,858,202 B2 | 12/2010 | Prigandt et al. | |
| 7,863,393 B2 | 1/2011 | Assmann et al. | |
| 7,906,594 B2 | 3/2011 | Muck et al. | |
| 7,915,350 B2 | 3/2011 | Schmalz et al. | |
| 7,943,726 B2 | 5/2011 | Haubs et al. | |
| 8,008,390 B2 | 8/2011 | Gunnewig et al. | |
| 8,128,845 B2 | 3/2012 | Moraczewski et al. | |
| 8,236,430 B2 | 8/2012 | Ziegler et al. | |
| 2003/0148117 A1 | 8/2003 | Takada et al. | |
| 2004/0118509 A1 | 6/2004 | Flexman et al. | |
| 2004/0121175 A1 | 6/2004 | Flexman et al. | |
| 2004/0157959 A1 | 8/2004 | Turgis et al. | |
| 2004/0228971 A1 | 11/2004 | Scaramuzzino | |
| 2005/0043492 A1 | 2/2005 | Chin et al. | |
| 2005/0107513 A1 | 5/2005 | Papke | |
| 2005/0131124 A1 | 6/2005 | Philippoz et al. | |
| 2005/0156351 A1 | 7/2005 | Straus et al. | |
| 2005/0173433 A1 | 8/2005 | Spahr | |
| 2006/0111507 A1 | 5/2006 | Papke | |
| 2006/0151505 A1 | 7/2006 | Kobayashi | |
| 2006/0175325 A1 | 8/2006 | Day | |
| 2006/0252912 A1 | 11/2006 | Hoffmockel et al. | |
| 2007/0010633 A1 | 1/2007 | Park et al. | |
| 2007/0049685 A1 | 3/2007 | Hansel et al. | |
| 2007/0154727 A1 | 7/2007 | Ziegler et al. | |
| 2007/0202332 A1 | 8/2007 | Gunnewig et al. | |
| 2007/0264514 A1 | 11/2007 | Prigandt et al. | |
| 2008/0029934 A1 | 2/2008 | Ziegler et al. | |
| 2008/0214748 A1 | 9/2008 | Assmann et al. | |
| 2009/0151707 A1 | 6/2009 | Davis et al. | |
| 2009/0189314 A1 | 7/2009 | Peerlings et al. | |
| 2009/0220719 A1 | 9/2009 | Klug et al. | |
| 2009/0264583 A1 * | 10/2009 | Kurz | C08G 18/0895 524/539 |
| 2009/0283931 A1 | 11/2009 | Pfeiffer et al. | |
| 2011/0086952 A1 | 4/2011 | Bessho et al. | |
| 2011/0195148 A1 | 8/2011 | Mentink et al. | |
| 2012/0091013 A1 | 4/2012 | Larson et al. | |
| 2012/0276314 A1 | 11/2012 | Latz et al. | |
| 2013/0082064 A1 | 4/2013 | Larson et al. | |

FOREIGN PATENT DOCUMENTS

| | | |
|---|---|---|
| DE | 44 36 107 A1 | 4/1996 |
| DE | 196 33 708 A1 | 2/1997 |
| DE | 10003370 A1 | 2/2001 |
| DE | 10 2005 016 130 A1 | 10/2006 |
| EP | 0 115 846 A2 | 2/1984 |
| EP | 0 108 324 A | 5/1984 |
| EP | 0116456 | 8/1984 |
| EP | 0137305 A2 | 4/1985 |
| EP | 0 156 285 A2 | 10/1985 |
| EP | 0276080 | 7/1988 |
| EP | 0342344 | 4/1989 |
| EP | 0 397 493 A2 | 1/1990 |
| EP | 0 397 492 A2 | 11/1990 |
| EP | 0 397 494 A2 | 11/1990 |
| EP | 0 398 585 A2 | 11/1990 |
| EP | 0397793 A1 | 11/1990 |
| EP | 0 400 827 A2 | 12/1990 |
| EP | 0511412 | 4/1991 |
| EP | 0 504 405 A1 | 9/1992 |
| EP | 0565304 | 4/1993 |
| EP | 0354802 B1 | 7/1993 |
| EP | 0420564 B1 | 10/1994 |
| EP | 0654501 | 11/1994 |
| EP | 0 716 105 A2 | 6/1996 |
| EP | 0 999224 A | 5/2000 |
| EP | 0992541 B1 | 9/2004 |
| EP | 1 869 121 B1 | 9/2009 |
| GB | 1017244 | 7/1962 |
| GB | 1009881 | 11/1965 |
| GB | 1009884 | 11/1965 |
| GB | 1331829 | 9/1973 |
| GB | 1335806 | 10/1973 |
| GB | 1377083 | 12/1974 |
| GB | 1444789 | 8/1976 |
| GB | 1 524 440 A | 9/1978 |
| GB | 1524410 A | 9/1978 |
| GB | 1590549 | 6/1981 |
| JP | S4741120 | 12/1972 |
| JP | 3 284675 | 12/1991 |
| JP | 4/114003 A | 4/1992 |
| JP | 4/145114 | 5/1992 |
| JP | 5/59255 A | 3/1993 |
| JP | 6 179673 | 6/1994 |
| JP | 7 010871 | 1/1995 |
| JP | 7 033766 | 2/1995 |
| JP | 2000-154181 | 6/2000 |
| JP | 2003-147161 | 5/2003 |
| JP | 2004204051 | 7/2004 |
| JP | 2012077258 A | 4/2012 |
| WO | WO 03/050187 | 6/2003 |
| WO | WO 2004/065444 | 5/2004 |
| WO | WO 2005/012380 A1 | 2/2005 |
| WO | WO 2006-089915 | 8/2006 |
| WO | WO 2006/097486 | 9/2006 |
| WO | WO 2006/105918 | 12/2006 |

(56) References Cited

FOREIGN PATENT DOCUMENTS

WO    WO 2007/073873 A1    5/2007
WO    WO 2007/073874 A1    5/2007

OTHER PUBLICATIONS

Co-pending U.S. Appl. No. 3/433,517, Guido Latz, filed Mar. 29, 2012.

Co-pending U.S. Appl. No. 13/879,360, Lowell Larson, filed Apr. 12, 2013.

Polyacetal resin composition having good surface-decorating property-comprising polyacetal resin, GP=II metal carbonate, phosphate or acetate, nitrogen-contg. Heterocycle and (co) polymer, Derwent, 1982, XP002284755, the whole document.

Braun et al., "Influences of structural parameters on the dynamic mechanical properties of polyacetals", *Die Arrgewandte Makromolekulare Chemie 228* (1995), pp. 185-200 (Nr. 4030).

Chujo et al., "Reversible Gelation of Polyoxazoline by Means of Diels-Alder Reaction", Macromolecules (1990), 23, 2636-2641.

Grohn, et al., "Ueber Den Zusammenhang Zwischen Der Molekulargewichtsverteilung Und Den Mechanischen Eigenschaften Von Polyoxymethylendiazetaten", Plaste Und Kautschuk, Leipzig, DE, Bd. 14, Nr. 11, Jan. 1, 1967 (Jan. 1, 1967), Seiten 795-797.

Ishida, "Polymerization of Formaldehyde and the Physical Properties of the Polymerization Products, I", *Journal of Applied Polymer Science*, vol. 26, pp. 2743-2750 (1981).

Kawaguchi et al, "Tensile Behavior of Glass-Fiber-Filled Polyacetal: Influence of the Functional Groups of Polymer Matrices", Journal of Applied Polymer Science, vol. 107, pp. 667-673 (2008).

Kobayashi et al., "Molecular Weight Distribution of Polyoxymethylene Obtained in Solid-State Polymerization of Trioxane Catalyzed by $BF_3O(C_2H_5)_2$", J. Macromol. Sci.—Chem., A1(8), pp. 1519-1529, Dec. 1967 (abstract only).

Mehrabzadeh et al., "Impact Modification of Polyacetal by Thermoplastic Elastomer Polyurethane", Journal of Applied Polymer Science, vol. 84, 2573-2582 (2002).

Saechtling, Kunststoff-TASchenbuch [Plastics Handbook], Hanser Verlag, $27^{th}$ Ed. 1998, pp. 202-217.

\* cited by examiner

IMPACT MODIFIED POLYOXYMETHYLENE COMPOSITION AND ARTICLES MADE THEREFROM THAT ARE STABLE WHEN EXPOSED TO ULTRAVIOLET LIGHT

RELATED APPLICATIONS

The present application is based on and claims priority to U.S. Provisional Application Ser. No. 61/789,023 filed Mar. 15, 2013, and U.S. Provisional Patent Application Ser. No. 61/746,458, filed Dec. 27, 2012, which are both incorporated herein by reference.

BACKGROUND

Polyacetal polymers, which are commonly referred to as polyoxymethylenes (POMs), have become established as exceptionally useful engineering materials in a variety of applications. POMs for instance, are widely used in constructing molded parts, such as parts for use in the automotive industry and the electrical industry. POMs, for instance, have excellent mechanical property, fatigue resistance, abrasion resistance, chemical resistance, and moldability.

Polyacetal resins also have a tendency to be relatively stiff and rigid. Thus, the polymers have impact strength characteristics that make them not well suited to some applications. In order to improve impact strength, polyacetal resins have been combined in the past with impact modifiers. Typical impact modifiers that have been employed have included aromatic polyurethanes and polymethacrylate butadiene styrene (MBS) acrylic-type modifiers. Adding the above impact modifiers to a polyacetal resin can significantly improve the impact strength of molded articles made from the combination of components. Unfortunately, however, the above impact modifiers have a tendency to discolor when exposed to ultraviolet light and/or heat. Attempts to stabilize the above compositions using commercially available UV stabilizers have been met with limited success. Thus, the above impact modified polyacetal resins have not been well suited for use in some applications.

For example, interior automotive parts are now required to have increased ductile properties for reasons related to passenger safety and for increasing aesthetic appeal. Such parts can include, for instance, trim pieces, visor clips, trim bezels, handles, airbag covers, and the like. Automotive manufacturers now desire that the above parts be flexible and ductile as opposed to being brittle and stiff. In order to meet the above requirements, polyacetal resins can be combined with the above described impact modifiers. Adding impact modifiers in order to increase the ductile properties of the parts, however, adversely affects the ability of the part to resist fading when subjected to ultraviolet light and the typical thermal cycles that interior automotive parts are subjected to during use.

In view of the above, a need currently exists for a composition containing a polyacetal resin that is not only ductile but is substantially stable when exposed to ultraviolet light and/or thermal cycles.

SUMMARY

In general, the present disclosure is directed to a polymer composition containing a polyoxymethylene polymer in combination with an impact modifier and optionally a coupling agent. In accordance with the present disclosure, in one embodiment, the impact modifier comprises an aliphatic impact modifier. In still another embodiment, the composition contains both an aliphatic impact modifier and an aliphatic coupling agent. The impact modifier can be combined with the polyoxymethylene polymer in a manner that increases the impact resistance properties of the composition without significantly degrading the ability of the composition to withstand exposure to ultraviolet light.

In accordance with the present disclosure, the polyoxymethylene polymer and the aliphatic impact modifier are combined with a coloring agent and one or more additives that, together, produce a composition that is unexpectedly resistant to ultraviolet light, especially when the composition exhibits a light or bright color. In accordance with the present disclosure, the particular ingredients are blended in controlled amounts and are selected such that the resulting color of a product molded from the composition does not undergo any significant degradation even when exposed to extremely high levels of ultraviolet light. In one embodiment, for instance, the composition can contain an ultraviolet light absorber and at least one hindered amine light stabilizer. In one embodiment, the composition can also optionally contain an antioxidant, such as a sterically hindered phenolic antioxidant. The ultraviolet light stabilizer, for instance, may comprise a benzotriazole, a benzoate, or a benzophenone.

Combining a polyoxymethylene polymer with an aliphatic impact modifier and optionally an aliphatic coupling agent in combination with other additives and stabilizers has been found to dramatically improve the ability of articles molded from the composition to be resistant to ultraviolet rays. For instance, molded articles made from the composition may continue to have vibrant and well defined color even after exposure to multiple cycles of ultraviolet radiation. In some embodiments, it has also been unexpectedly discovered that an aliphatic coupling agent can reduce formaldehyde emissions produced by the polyoxymethylene composition. In fact, the aliphatic impact modifier and/or the aliphatic coupling agent can provide numerous benefits and advantages to the composition without compromising many physical properties.

The impact modifier may comprise an aliphatic thermoplastic polyurethane elastomer. The impact modifier can be present in the composition in an amount from about 5% to about 40% by weight, such as in an amount from about 10% to about 30% by weight, such as in an amount from about 15% to about 25% by weight.

The impact modifier generally comprises a thermoplastic polyurethane elastomer that may, in one embodiment, be produced by reacting an isocyanate with a diol chain extender and a polyol. The isocyanate used to form the thermoplastic polyurethane elastomer can comprise an aliphatic isocyanate. In one embodiment, the aliphatic thermoplastic polyurethane elastomer may be polyester-based or polyether-based. In another embodiment, the thermoplastic polyurethane elastomer may contain polycarbonate groups. The polycarbonate groups may be incorporated into the elastomer through the use of a diol component containing carbonate groups.

The impact modifier can have a Shore A hardness measured according to ASTM Test D2240 of greater than about 72, such as greater than about 76, such as greater than about 82, such as greater than about 84. In general, the Shore A hardness of the impact modifier is generally less than about 95.

The aliphatic coupling agent, when present, may comprise any suitable coupling agent capable of coupling together polymer chains of the polyoxymethylene polymer and/or coupling together an impact modifier and the polyoxymethylene. In one embodiment, the coupling agent comprises an aliphatic isocyanate compound. One particular embodiment, the aliphatic coupling agent comprises isophorone diisocyanate.

The aliphatic coupling agent may be linear or cyclic. The aliphatic coupling agent can also be monofunctional, bifunctional, or, in one embodiment, can be trifunctional or greater. Examples of coupling agents that may be used according to the present disclosure include hexamethylene diisocyanate dimer; hexamethylene diisocyanate biuret; hexamethylene diisocyanate isocyanurate; 1,3,5-Triazine-2,4,6(1H,3H,5H)-trione; 1,3,5-tris[(5-isocyanato-1,3,3-trimethylcyclohexyl)methyl]; 1,3-Propanediol, 2-ethyl-2-(hydroxymethyl)-, 5-isocyanato-1-(isocyanatomethyl)-1,3,3-trimethylcyclohexane; Hexanoic acid, [[2-ethyl-2-[[[[[5-isocyanato-1(or 5)-(methoxycarbonyl)pentyl]amino]carbonyl]oxy]methyl]-1,3-propanediyl]bis(oxycarbonylimino)]bis isocyanato-, dimethylester; and mixtures thereof.

The amount of coupling agent added to the polymer composition of the present disclosure can vary depending upon various different factors. For instance, the amount added can depend on whether the coupling agent is monofunctional, difunctional, trifunctional, or greater. Other factors to consider are the relative amounts of the other ingredients and the impact that the coupling agent may have on the melt viscosity of the composition. In general, the coupling agent may be present in the composition in an amount from about 0.05% to about 5% by weight, such as from about 0.2% to about 2% by weight. When using a coupling agent that is trifunctional or greater, the coupling agent can be present in an amount from about 0.05% to about 1.5% by weight, such as from about 0.5% to about 1.2% by weight.

In one embodiment, the polyoxymethylene polymer can be present in the polymer composition in an amount of at least about 40% by weight, such as in an amount of at least 50% by weight, such as in an amount of at least about 60% by weight, such as in an amount of at least about 70% by weight, such as in an amount of at least about 80% by weight. In general, the polyoxymethylene polymer is present in the composition in an amount less than about 95% by weight, such as in an amount less than about 90% by weight.

The coloring agent present in the polymer composition may comprise any suitable pigment. In general, the coloring agent may be present in the composition in an amount less than about 5% by weight, such as in an amount less than about 2% by weight. In one embodiment, the coloring agent may comprise an inorganic pigment, such as titanium dioxide. Alternatively, the coloring agent may comprise an organic pigment, which includes dyes. The coloring agent may be present in the polymer composition in an amount sufficient to provide the pigment with a suitable color and shade. When producing automotive parts, for instance, the polymer composition may contain a coloring agent that gives molded articles made from the composition a gray color, a green color, a red color, a brown color (which includes beige), a black color, a white (or off-white) color or the like.

In addition to the components described above, the polymer composition may contain various other additives and ingredients. For instance, the composition can contain light stabilizers, antioxidants, In one embodiment, the composition contains an antioxidant, such as a sterically hindered phenolic antioxidant.

Another ingredient that may be present in the composition is an ultraviolet light absorber. The ultraviolet light absorber, for instance, may comprise a benzotriazole.

The polymer composition made in accordance with the present disclosure can be formulated so as to exhibit a color difference value (DEcmc) of less than about 8, such as less than about 5, such as less than about 3, after exposure to five cycles of 280 kJ/m$^2$ irradiation per cycle in a xenon arc weatherometer operated according to Volkswagen Test PV 1303. After ten cycles, the color difference value can be less than about 10, such as less than about 7, such as less than about 3.

The polymer composition can also be formulated so as to exhibit a gray scale value after exposure to five cycles of 280 kJ/m$^2$ irradiation of at least 3, such as at least 3-4. After ten cycles of irradiation, the gray scale value can be at least 2, such as at least 2-3.

Remarkably, the polymer composition can exhibit the above properties even when having a color that can easily degrade, such as light gray. For instance, in one embodiment, the polymer composition can have the above properties while still displaying a color according to the CIELab color values (L*, a*, b*) such that the L* value can be greater than 25, such as greater than 30, such as from about 50 to about 80, or being light gray in color.

In certain embodiments, the polymer composition may exhibit a light gray, red, brown, green, blue, white or purple color.

In order to produce molded articles in accordance with the present disclosure, in one embodiment, the polymer composition can be heated in an extruder and injection molded to form a desired shape. The heated polymer composition, for instance, can be injected into a mold for producing various products. In one embodiment, for instance, the polymer composition may be used to produce automotive parts configured to be located within an interior of a vehicle. For example, the automotive part may comprise a trim bezel, a handle, or the like.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
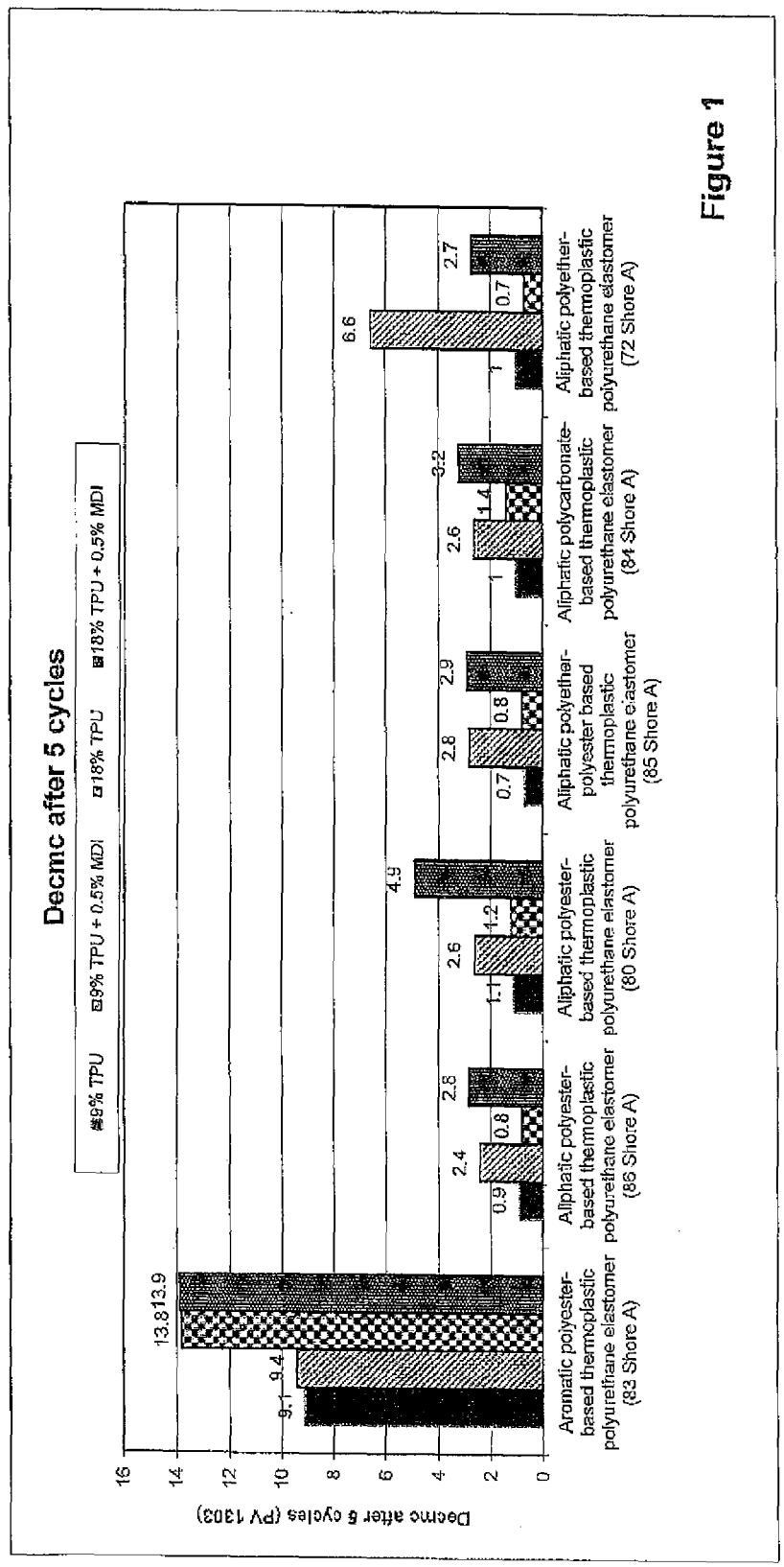
FIGS. 1-10 are graphical representations of the results obtained in the examples described below.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to polymer compositions that contain a oxymethylene polymer and are stable to ultraviolet light. In certain embodiments, the polymer composition can also have increased impact resistance properties in conjunction with other beneficial physical properties. In one embodiment, for instance, the present disclosure is directed to a polymer composition containing an oxymethylene polymer combined with an impact modifier and optionally a coupling agent. In accordance with the present disclosure, at least the impact modifier comprises an aliphatic compound. For instance, in one embodiment, the impact modifier is an aliphatic impact modifier. In an alternative embodiment, the coupling agent is an aliphatic coupling agent. In still another embodiment, the polymer composition contains both an aliphatic impact modifier and an aliphatic coupling agent. The polyoxymethylene polymer can include functional groups, such as hydroxyl groups, that react with the coupling agent. The coupling agent can be configured to couple the polyoxymethylene polymer to the impact modifier.

The use of an aliphatic impact modifier in combination with one or more light absorbers or stabilizers has been found to dramatically improve the stability of the composition when exposed to light, particularly ultraviolet light. In particular, it is believed that the aliphatic impact modifier and the light stabilizers synergistically work together to stabilize the color of the material even when exposed to ultraviolet light, which is especially demonstrated when the color of the composition or the molded part has a light shade, such as when the L* value is greater than 25, such as greater than 27, such as greater than 30. Greatly improved color stability can be achieved especially in comparison to compositions containing an aromatic impact modifier. Unexpectedly, it was also discovered that an aliphatic coupling agent can also decrease formaldehyde emissions, in comparison to compositions containing an aromatic coupling agent.

In addition to the above components, the polymer composition can also contain a lubricant. It is believed that the lubricant, in some embodiments, may also serve to improve the stability of the composition. For instance, it is believed that the lubricant may actually help disperse the light stabilizers and ultraviolet light absorbers and the aliphatic impact modifier into the polymer matrix. The lubricant can also enhance processability and prevent polymer degradation. It was unexpectedly discovered that the lubricant, one or more light stabilizers, and one or more ultraviolet light absorbers can be added in relatively small amounts, such as less than about 2% by weight, such as less than about 1% by weight, and still provide the desired color stability.

The above combination of components has been found to produce a highly ductile polymer composition that is relatively ultraviolet light stable. Thus, various coloring agents can be added to the composition for producing molded articles having a desired color and shade. Even after exposure to repeated amounts of ultraviolet light, the polymer composition has shown excellent resistance to color change and color degradation.

For example, molded articles made according to the present disclosure can withstand ultraviolet light without significant discoloration even when subjected to the most stringent of tests. For example, automotive manufacturers have recently placed further demands on the properties and durability of components for use in producing automobiles, especially for automotive parts that are intended to be made a part of the interior of the automobile. For instance, various tests exist that are referred to as hot lightfastness tests in which a molded article is subjected to ultraviolet light produced by a xenon arc lamp. In some tests, during exposure to ultraviolet light, the molded articles are also subjected to heat. One test, for instance, that has been used in the past is SAE (Society of Automotive Engineers) Standard J1885. SAE Standard J1885, for instance, is described in U.S. Pat. No. 4,996,253, which is incorporated herein by reference.

Another test that was developed for investigating lightfastness of interior automotive parts is Volkswagen Test PV 1303 (2001-03). Test PV 1303 is based on ISO Test 105-B06 and Test VDA 75202. According to Test PV 1303, a specimen is subjected to continuous light emitted by a xenon arc lamp using window glass as a filter system. The test uses the following parameters:

| | |
|---|---|
| UV cut-on | 320 nm |
| E in W/m² (300-400 nm) | 60 |
| E in W/m² nm at 420 nm | 1.2 |
| BST in ° C. (light) | 100 |
| CHT in ° C. (light) | 65 |
| RH in % (light) | 20 |

Volkswagen Test PV 1303 is intended to be applied to non-metal materials intended for use in vehicle interiors.

When subjecting specimens to Volkswagen Test PV 1303, the specimen can be exposed to one or more cycles of exposure to ultraviolet light. In one embodiment, for instance, the specimen can be subjected to ten cycles (2800 kJ/m² or 280 kJ/m² per cycle).

After being subjected to the above tests, total color difference of the specimen after exposure can be measured as well as evaluating the color change visually. Measurement is performed using a DataColor 600 Spectrophotometer utilizing an integrating sphere with measurements made using the specular included mode. Color coordinates are calculated according to ASTM D2244-11 under illuminant D65, 10° observer, using CIELab units. A further modification of CIELab units can be performed according to AATCC Test Method 173-1992 whereby a total color difference is calculated using the CMC equation (DEcmc). This color difference scale has shown better correlation to visual assessment compared to CIELab or HunterLAB equations. Using the CMC equation, a lightness to chroma ratio (l:c ratio) of 1.3:1 is used. Visual evaluation of color change after exposure is performed using an AATCC 10 step gray scale according to AATCC Evaluation Procedure 1/ISO 105-A02.

As described above, polymer compositions made according to the present disclosure are very stable even when exposed to relatively high amounts of ultraviolet light. In this regard, molded articles made from the polymer composition can, in one embodiment, include a coloring agent in an amount sufficient for the polymer article to display a desired color. Of particular advantage, polymer compositions made according to the present disclosure that contain a coloring agent and can exhibit a color difference value (DEcmc) of less than about 8, such as less than about 5, such as even less than about 3 when exposed to five cycles of 280 kJ/m² irradiation per cycle emitted by a xenon arc weatherometer operated according to VW Test PV 1303. After ten cycles of irradiation, the polymer composition can exhibit a color difference value of less than about 10, such as less than about 7, such as even less than about 5.

The polymer composition can possess the above light stable properties, even when containing a coloring agent and displaying a color that traditionally has been difficult to maintain when exposed to ultraviolet light. In particular, the composition can display a color that is susceptible to visual changes when the smallest amount of color change occurs due to degradation such as light colors or colors that exhibit a light shade. For instance, in certain embodiments, the polymer composition may, when molded into a product, display a color such as light gray, red, green, blue, purple, orange, white or even yellow.

In one embodiment, in order to characterize the color of the composition, the color can be expressed objectively using the CIELab color scale and specifying values for L*, a*, and b*. CIE L*a*b* (CIELAB) is a color space specified by the International Commission on Illumination (French Commission internationale de l'éclairage, hence its CIE initialism). It describes all the colors visible to the human eye and was created to serve as a device-independent model to be used as a reference.

The three coordinates of CIELab represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow).

Thus, the CIELab color scale may be used to characterize and quantitatively describe perceived colors with a relatively high level of precision. More specifically, CIELab may be used to illustrate a gamut of color because L*a*b* color space has a relatively high degree of perceptual uniformity between colors. As a result, L*a*b* color space may be used to describe the gamut of colors that an ordinary observer may actually perceive visually.

CIELab allows a color to be plotted in a three-dimensional space analogous to the Cartesian xyz space. Any color may be plotted in CIELab according to the three values (L*, a*, b*). For example, there is an origin with two axis a* and b* that are coplanar and perpendicular, as well as an L-axis which is perpendicular to the a* and b* axes, and intersects those axes only at the origin. A negative a* value represents green and a positive a* value represents red. CIELab has the colors blue-violet to yellow on what is traditionally the y-axis in Cartesian xyz space. CIELab identifies this axis as the b*-axis. Negative b* values represent blue-violet and positive b* values represent yellow. CIELab has lightness on what is traditionally the z-axis in Cartesian xyz space. CIELab identifies this axis as the L-axis. The L*-axis ranges in value from 100, which is white, to 0, which is black. An L* value of 50 represents a mid-tone gray (provided that a* and b* are 0). Any color may be plotted in CIELab according to the three values (L*, a*, b*). As described supra, equal distances in CIELab space correspond to approximately uniform changes in perceived color. As a result, one of skill in the art is able to approximate perceptual differences between any two colors by treating each color as a different point in a three dimensional, Euclidian, coordinate system, and calculating the Euclidian distance between the two points ($\Delta E^*_{ab}$).

In accordance with the present disclosure, the polymer composition can display a color having an L* value greater than 25, such as greater than 27, such as greater than 30, such as from 30 to 100, such as from about 50 to about 80, or being light gray in color.

As used herein, the L* value is measured using a sphere geometry, specular included.

Polymer compositions made according to the present disclosure are primarily comprised of a polyacetal resin, which is also commonly referred to as a polyoxymethylene polymer. In general, any suitable polyacetal resin can be used in accordance with the present disclosure. In one particular embodiment, a polyacetal resin is used that contains a relatively low amount of formaldehyde content. For example, the polyacetal resin can have an initial formaldehyde content of less than about 1,000 ppm, such as from about 20 ppm to about 500 ppm. For example, the polyacetal resin can contain formaldehyde in an amount from about 20 ppm to about 250 ppm, such as from about 20 ppm to about 150 ppm.

The polyacetal resin may comprise a homopolymer or a copolymer and can include end caps. The homopolymers may be obtained by polymerizing formaldehyde or trioxane, which can be initiated cationically or anionically. The homopolymers can contain primarily oxymethylene units in the polymer chain. Polyacetal copolymers, on the other hand, may contain oxyalkylene units along side oxymethylene units. The oxyalkylene units may contain, for instance, from about 2 to about 8 carbon units and may be linear or branched. In one embodiment, the homopolymer or copolymer can have hydroxy end groups that have been chemically stabilized to resist degradation by esterification or by etherification.

As described above, the homopolymers are generally prepared by polymerizing formaldehyde or trioxane, preferably in the presence of suitable catalysts. Examples of particularly suitable catalysts are boron trifluoride and trifluoromethanesulfonic acid.

Polyoxymethylene copolymers can contain alongside the —$CH_2O$— repeat units, up to 50 mol %, such as from 0.1 to 20 mol %, and in particular from 0.5 to 10 mol %, of repeat units of the following formula

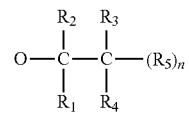

where $R^1$ to $R^4$, independently of one another, are a hydrogen atom, a $C_1$-$C_4$-alkyl group, or a halo-substituted alkyl group having from 1 to 4 carbon atoms, and $R^5$ is —$CH_2$—, —O—$CH_2$—, or a $C_1$-$C_4$-alkyl- or $C_1$-$C_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

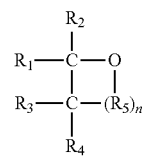

where $R^1$ to $R^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

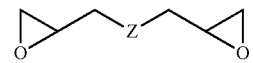

where Z is a chemical bond, —O— or —ORO—(R=$C_1$-$C_8$-alkylene or $C_2$-$C_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Polyacetal resins as defined herein can also include functional terminal groups. Such resins, for instance, can have pendant hydroxyl groups.

More particularly, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 5 mmol/kg, such as at least 10 mmol/kg, such as at least 15 mmol/kg. In one embodiment, the terminal hydroxyl group content ranges from 18 to 50 mmol/kg.

In addition to the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —CH$_2$O-repeat units.

In addition to having a relatively high terminal hydroxyl group content, the polyoxymethylene polymer according to the present disclosure can also have a relatively low amount of low molecular weight constituents. As used herein, low molecular weight constituents (or fractions) refer to constituents having molecular weights below 10,000 dalton. In certain embodiments, for instance, the polyoxymethylene polymer may contain low molecular weight constituents in an amount less than about 10%, such as less than about 5% by weight, such as in an amount less than about 3% by weight, such as even in an amount less than about 2% by weight.

The preparation of the polyoxymethylene as described above can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted. The above-described procedure for the polymerization can lead to polymers having comparatively small proportions of low molecular weight constituents. If a further reduction in the content of low molecular weight constituents were to be desired, this can be effected by separating off the low molecular weight fractions of the polymer after the deactivation and the degradation of the unstable fractions after treatment with a basic protic solvent. This may be a fractional precipitation from a solution of the stabilized polymer; polymer fractions of different molecular weight distribution being obtained.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2% by weight.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

$$H_x[M_mM'_nO_z]·yH_2O$$

wherein
M represents an element selected from the group consisting of P, Si, Ge, Sn, As, Sb, U, Mn, Re, Cu, Ni, Ti, Co, Fe, Cr, Th or Ce,
M' represents an element selected from the group consisting of W, Mo, V or Nb,
m is 1 to 10,
n is 6 to 40,
z is 10 to 100,
x is an integer of 1 or above, and
y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid (H$_3$PMo$_{12}$O$_{40}$) and 12-tungstophosphoric acid (H$_3$PW$_{12}$O$_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

$$(ROOC)—(CH_2)_n—(COOR')$$

wherein
n is an integer from 2 to 12, preferably 3 to 6 and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

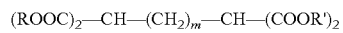

wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

The polyoxymethylene polymer present in the composition can generally have a melt volume rate (MVR) of less than 50 cm$^3$/10 min, such as from about 1 to about 40 cm$^3$/10 min, determined according to ISO 1133 at 190° C. and 2.16 kg.

Polyacetal resins or polyoxymethylenes that may be used in accordance with the present disclosure generally have a melting point of greater than about 150 degrees C. The molecular weight of the polymer can generally range from about 2,000 to about 1,000,000, such as from about 7,000 to about 150,000.

The amount of polyoxymethylene polymer present in the polymer composition of the present disclosure can vary depending upon the particular application. In one embodiment, for instance, the composition contains polyoxymethylene polymer in an amount of at least 40% by weight, such as at least 50% by weight, such as in an amount greater than about 60% by weight, such as in an amount greater than about 65% by weight, such as in an amount greater than about 70% by weight. In general, the polyoxymethylene polymer is present in an amount less than about 95% by weight, such as in an amount less than about 90% by weight, such as in an amount less than about 85% by weight.

In addition to one or more polyoxymethylene polymers, the polymer composition of the present disclosure also contains an impact modifier and optionally a coupling agent wherein at least one of the components is an aliphatic compound or polymer. The coupling agent can be designed to couple together adjacent polyoxymethylene polymer chains. The coupling agent also couples the polyoxymethylene polymer to the impact modifier.

In one embodiment, when present, an aliphatic coupling agent is used that may comprise an isocyanate. For instance, in one embodiment, the aliphatic coupling agent may comprise isophorone diisocyanate. Other aliphatic coupling agents that may be used in accordance with the present disclosure include hexamethylene diisocyanate dimer; hexamethylene diisocyanate biuret; hexamethylene diisocyanate isocyanurate; 1,3,5-Triazine-2,4,6(1H,3H,5H)-trione; 1,3,5-tris[(5-isocyanato-1,3,3-trimethylcyclohexyl)methyl]; 1,3-Propanediol, 2-ethyl-2-(hydroxymethyl)-, 5-isocyanato-1-(isocyanatomethyl)-1,3,3-trimethylcyclohexane; Hexanoic acid, [[2-ethyl-2-[[[[[5-isocyanato-1(or 5)-(methoxycarbonyl)pentyl]amino]carbonyl]oxy]methyl]-1,3-propanediyl]bis(oxycarbonylimino)]bis isocyanato-, dimethylester; and mixtures thereof.

The aliphatic coupling agent can be monofunctional, bifunctional, or can be trifunctional or greater. In one embodiment, for instance, a trifunctional coupling agent is used.

The amount of coupling agent added to the polymer composition, can vary depending upon various factors. In one embodiment, the coupling agent is present in an amount greater than about 0.1% by weight such as in an amount greater than 0.5% by weight. In general, the coupling agent is present in an amount less than about 5% by weight, such as in an amount less than about 3% by weight, such as in an amount less than about 2% by weight, such in an amount less than about 1.5% by weight. A trifunctional coupling agent, for instance, may be present in an amount from about 0.1% to about 3% by weight, such as from about 0.5% to about 2% by weight. A bifunctional coupling agent, however, may be added greater than specified above for a trifunctional coupling agent.

In one embodiment, the coupling agent is added in an amount sufficient for coupling to occur between polymer chains in the composition without drastically reducing the melt flow rate of the composition. For instance, the coupling agent may be added such that the melt flow rate (at 190° C. and at 2.16 kg) is greater than about 1 cm$^3$/10 minutes, such as greater than about 1.5 cm$^3$/10 minutes, such as greater than about 2 cm$^3$/10 minutes. In general, the melt flow rate is less than 30 cm$^3$/10 minutes such as less than about 15 cm$^3$/10 minutes. In one embodiment, the polymer composition has a melt flow rate of from about 7 cm$^3$/10 minutes to about 30 cm$^3$/10 minutes.

As described above, the polymer composition also contains an impact modifier. The coupling agent may couple the impact modifier to the polyoxymethylene polymer. The impact modifier may comprise, for instance, a thermoplastic elastomer. In general, any suitable thermoplastic elastomer, such as a thermoplastic polyurethane elastomer may be incorporated into the composition.

In one embodiment, an aliphatic impact modifier may be used.

Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Particular thermoplastic elastomers well suited for use in the present disclosure include aliphatic thermoplastic polyurethane elastomers. Thermoplastic polyurethane elastomers can include segmented block copolymers comprised of hard and soft segments. The hard segments can be aliphatic as opposed to being aromatic. In general, the hard segments are formed by combining an isocyanate, such as a diisocyanate, with a chain extender, such as a diol. In order to form an aliphatic thermoplastic polyurethane elastomer, the isocyanate used to form the hard segments may comprise an aliphatic isocyanate.

Examples of aliphatic isocyanates include 1,6-hexamethylene diisocyanate, alicyclic diisocyanates such as isophorone diisocyanate, and the like. Other aliphatic isocyanates include metatetramethylxylene diisocyanate, paratetramethylxylene diisocyanate, hydrogenated 4,4'-methylenebis (cyclohexylisocyanate), and the like.

Diol chain extenders that may be used to produce the hard segments can include aliphatic diols having from about two carbon atoms to about six carbon atoms in the carbon chain.

Particular examples include ethylene glycol, 1,4-butane diol, 1,6-hexane diol, neopentyl glycol, and the like.

The soft segment of the thermoplastic polyurethane elastomer, on the other hand, may be derived from a long-chain diol. As described above, the long-chain diol may comprise a polyester diol or a polyether diol. The long-chain diol may comprise polybutylene adipate diol, polyethylene adipate diol, polytetramethylene ether glycol, polypropylene oxide glycol, polyethylene oxide glycol, polycaprolactone units, and mixtures thereof.

In one embodiment, the long-chain diol may comprise a diol containing carbonate groups. For instance, the thermoplastic elastomer can be produced as described above by reacting together a polymer diol containing carbonate groups with an aliphatic isocyanate and a chain extender. The polymer diol, for instance, may comprise a polycarbonate diol and/or a polyester polycarbonate diol.

A polycarbonate diol may be produced by reacting a diol with a carbonate compound. The carbonate compound may comprise, for instance, a carbonate compound with alkyl groups, a carbonate compound with alkylene groups, or a carbonate compound containing aryl groups. Particular carbonate compounds include dimethyl carbonate, diethyl carbonate, ethylene carbonate, and/or diphenyl carbonate. A polyester polycarbonate, on the other hand, may be formed by reacting a diol with a carbonate compound as described above in the presence of a carboxylic acid.

The soft segments can be present in the impact modifier in an amount sufficient for the impact modifier to have a Shore A hardness of from about 60 to about 95. The Shore A hardness of the impact modifier, for instance, may be generally greater than about 60, such as greater than about 70, such as greater than about 80. Shore A hardness can be measured according to ASTM Test D2240.

The amount of impact modifier contained in the polymer composition can vary depending upon various factors. The amount of impact modifier present in the composition may depend, for instance, on the desired impact resistance properties of articles made from the composition. In general, one or more aliphatic impact modifiers may be present in the composition in an amount greater than about 5% by weight, such as in an amount greater than about 10% by weight, such as in an amount greater than about 15% by weight. The impact modifier is generally present in an amount less than about 40% by weight, such as in an amount less than about 30% by weight.

The impact modifier may be present such that the polymer composition has desired impact strength resistant properties. For instance, the polymer composition may have a Charpy notched impact strength of greater than about 3 kJ/m$^2$ when measured at −30° C. according to ISO Test 179/1eA. For instance, the polymer composition may have a Charpy notched impact strength of greater than about 4 kJ/m$^2$ when measured at −30° C., such as greater than about 5 kJ/m$^2$, such as greater than about 6 kJ/m$^2$. In general, the Charpy notched impact strength is less than about 25 kJ/m$^2$ at −30° C.

When measured at 23° C., the Charpy notched impact strength of the polymer composition can be greater than about 6 kJ/m$^2$, such as greater than about 8 kJ/m$^2$, such as greater than about 10 kJ/m$^2$, such as greater than about 12 kJ/m$^2$.

In order to further improve stability of the polymer composition when exposed to ultraviolet light, the polymer composition can also include one or more antioxidants, UV stabilizers, and/or UV absorbers.

One example of an antioxidant that may be present in the composition comprises a sterically hindered phenolic antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245.

Light stabilizers that may be present in the composition include sterically hindered amines. Such compounds include 2,2,6,6-tetramethyl-4-piperidyl compounds, e.g., bis(2,2,6,6-tetramethyl-4-piperidyl) sebacate (Tinuvin 770, BASF) or the polymer of dimethyl succinate, 1-(2-hydroxyethyl)-4-hydroxy-2,2,6,6-tetramethyl-4-piperidine (Tinuvin 622, BASF), Bis(1,2,2,6,6-pentamethyl-4-piperidinyl)-[[3,5-bis(1,1-dimethylethyl)-4-hydroxyphenyl]methyl]butylmalonate (Tinuvin PA 144), or 3,9-bis(2-hydroxy-1,1-dimethylethyl)-2,4,8,10-tetraoxaspiro[5,5]undecane (Adeka Stab LA 63P).

In one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g., 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-g-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyoxanilide and 2-ethoxy-4'-dodecyloxanilide; cyanoacrylates, e.g., ethyl-α-cyano-β,β-diphenylacrylate and methyl-2-cyano-3-methyl-3-(p-methoxyphenyl)acrylate, or mixtures thereof. For instance, in one embodiment, the ultraviolet light absorber may comprise 2-[2-hydroxy-3,5-di-(1,1-dimethylbenzyl)]-2H-benzotriazole.

In one embodiment, the composition may also contain one or more lubricants. The lubricant may comprise a polymer wax composition. Lubricants that may be included in the composition include, for instance, N,N'-ethylene bisstearamide (EBS). In one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount from about 0.01% to about 5% by weight. For instance, a lubricant can be present in an amount greater than about 0.1% by weight, such as in an amount from about 0.1% to about 1% by weight. The above polyethylene glycol polymer can also be present in an amount up to about 5% by weight. For instance, the polyethylene glycol polymer can be present in an amount from about 0.1% to about 2% by weight, such as from about 0.5% to about 1% by weight.

Each of the above additives may be present in the composition in an amount up to about 5% by weight, such as in an amount from about 0.1% to about 2% by weight. In one embodiment, for instance, the additives are present in an amount less than about 1% by weight.

The polymer composition of the present disclosure also generally contains a coloring agent. The coloring agent may comprise any suitable pigment, which includes dyes. The pigment may comprise an inorganic pigment or an organic pigment. Pigments that may be present in the composition include, for instance, titanium dioxide, ultramarine blue, cobalt blue, phthalocyanines, anthraquinones, mixtures thereof, and the like. Other colorants can include carbon black or various other polymer-soluble dyes. If desired, the coloring agent may also comprise a metallic pigment, such as an aluminum pigment. The coloring agents can be present alone or in combination in an amount up to about 2% by weight, such as in an amount from about 0.01% to about 1% by weight. In one embodiment, the coloring agent may be added to the polymer composition as a masterbatch.

In order to reduce formaldehyde emissions from the polymeric composition, the composition can also optionally contain a formaldehyde scavenger, such as a nitrogen containing compound. A formaldehyde scavenger is a compound that reacts and binds formaldehyde. When incorporating a nitrogen containing compound into the composition, the initial formaldehyde content of the polyacetal polymer is desirably low. For example, by using a polyacetal polymer that has an initial formaldehyde content of less than about 500 ppm, the nitrogen composition becomes well dispersed within the polymer and, in fact, has been found to solubilize within the polymer.

In general, the total amount of formaldehyde scavengers present in the composition is relatively small. For instance, the formaldehyde scavengers can be present in an amount less than about 2 percent by weight, such as from about 0.01 percent to about 2 percent by weight, such as from about 0.05 percent to about 0.5 percent by weight (which excludes other nitrogen containing compounds that may be present in the composition that are not considered formaldehyde scavengers such as waxes or hindered amines). Any suitable formaldehyde scavenger can be included into the composition including, for example, aminotriazine compounds, allantoin, hydrazides, polyamides, melamines, or mixtures thereof. In one embodiment, the nitrogen containing compound may comprise a heterocyclic compound having at least one nitrogen atom adjacent to an amino substituted carbon atom or a carbonyl group. In one specific embodiment, for instance, the nitrogen containing compound may comprise benzoguanamine.

In still other embodiments, the nitrogen containing compound may comprise a melamine modified phenol, a polyphenol, an amino acid, a nitrogen containing phosphorus compound, an acetoacetamide compound, a pyrazole compound, a triazole compound, a hemiacetal compound, other guanamines, a hydantoin, a urea including urea derivatives, and the like.

The nitrogen containing compound may comprise a low molecular weight compound or a high molecular weight compound. The nitrogen-containing compound having a low molecular weight may include, for example, an aliphatic amine (e.g., monoethanolamine, diethanolamine, and tris-(hydroxymethyl)aminomethane), an aromatic amine (e.g., an aromatic secondary or tertiary amine such as o-toluidine, p-toluidine, p-phenylenediamine, o-aminobenzoic acid, p-aminobenzoic acid, ethyl o-aminobenzoate, or ethyl p-aminobenzoate), an imide compound (e.g., phthalimide, trimellitimide, and pyromellitimide), a triazole compound (e.g., benzotriazole), a tetrazole compound (e.g., an amine salt of 5,5'-bitetrazole, or a metal salt thereof), an amide compound (e.g., a polycarboxylic acid amide such as malonamide or isophthaldiamide, and p-aminobenzamide), hydrazine or a derivative thereof [e.g., an aliphatic carboxylic acid hydrazide such as hydrazine, hydrazone, a carboxylic acid hydrazide (stearic hydrazide, 12-hydroxystearic hydrazide, adipic dihydrazide, sebacic dihydrazide, or dodecane diacid dihydrazide; and an aromatic carboxylic acid hydrazide such as benzoic hydrazide, naphthoic hydrazide, isophthalic dihydrazide, terephthalic dihydrazide, naphthalenedicarboxylic dihydrazide, or benzenetricarboxylic trihydrazide)], a polyaminotriazine [e.g., guanamine or a derivative thereof, such as guanamine, acetoguanamine, benzoguanamine, succinoguanamine, adipoguanamine, 1,3,6-tris(3,5-diamino-2,4,6-triazinyl)hexane, phthaloguanamine or CTU-guanamine, melamine or a derivative thereof (e.g., melamine, and a condensate of melamine, such as melam, melem or melon)], a salt of a polyaminotriazine compound containing melamine and a melamine derivative with an organic acid [for example, a salt with (iso)cyanuric acid (e.g., melamine cyanurate)], a salt of a polyaminotriazine compound containing melamine and a melamine derivative with an inorganic acid [e.g., a salt with boric acid such as melamine borate, and a salt with phosphoric acid such as melamine phosphate], uracil or a derivative thereof (e.g., uracil, and uridine), cytosine and a derivative thereof (e.g., cytosine, and cytidine), guanidine or a derivative thereof (e.g., a non-cyclic guanidine such as guanidine or cyanoguanidine; and a cyclic guanidine such as creatinine), urea or a derivative thereof [e.g., biuret, biurea, ethylene urea, propylene urea, acetylene urea, a derivative of acetylene urea (e.g., an alkyl-substituted compound, an aryl-substituted compound, an aralkyl-substituted compound, an acyl-substituted compound, a hydroxymethyl-substituted compound, and an alkoxymethyl-substituted compound), isobutylidene diurea, crotylidene diurea, a condensate of urea with formaldehyde, hydantoin, a substituted hydantoin derivative (for example, a mono or $diC_{1-4}$alkyl-substituted compound such as 1-methylhydantoin, 5-propylhydantoin or 5,5-dimethylhydantoin; an aryl-substituted compound such as 5-phenylhydantoin or 5,5-diphenylhydantoin; and an alkylaryl-substituted compound such as 5-methyl-5-phenyl-hydantoin), allantoin, a substituted allantoin derivative (e.g., a mono, di or $triC_{1-4}$alkyl-substituted compound, and an aryl-substituted compound), a metal salt of allantoin (e.g., a salt of allantoin with a metal element of the Group 3B of the Periodic Table of Elements, such as allantoin dihydroxyaluminum, allantoin monohydroxyaluminum or allantoin aluminum), a reaction product of allantoin with an aldehyde compound (e.g., an adduct of allantoin and formaldehyde), a compound of allantoin with an imidazole compound (e.g., allantoin sodium dl-pyrrolidonecarboxylate), an organic acid salt].

The nitrogen-containing resin may include, for example, a homo- or copolymer of a polyvinylamine, a homo- or copolymer of a polyallylamine, an amino resin obtainable from a reaction by using formaldehyde (e.g., a condensation resin such as a guanamine resin, a melamine resin or a guanidine resin; a co-condensation resin such as a phenol-melamine resin, a benzoguanamine-melamine resin or an aromatic polyamine-melamine resin), an aromatic amine-formaldehyde resin (e.g., aniline resin), a polyamide resin (e.g., a homo- or copolymerized polyamide such as nylon 3 (poly-β-alanine), nylon 46, nylon 6, nylon 66, nylon 11, nylon 12, nylon MXD6, nylon 6-10, nylon 6-11, nylon 6-12, or nylon 6-66-610, a substituted polyamide containing a methylol or alkoxymethyl group), a polyesteramide, a polyamideimide, a polyurethane, a poly(meth)acrylamide, a copolymer of (meth)acrylamide and other vinyl monomer, a poly(vinyllactam), a copolymer of vinyllactam and other vinyl monomer (for example, homo- or copolymers described in Japanese Patent Application Laid-Open No. 52338/1980 (JP-55-52338A), and U.S. Pat. No. 3,204,014)), a poly(N-vinylformamide) or a derivative thereof (e.g., an N-vinylformamide-N-vinylamine copolymer) (for example, trade name "PNVE Series" manufactured by Mitsubishi Chemical Corporation), a copolymer of N-vinylformamide and other vinyl monomer, a poly(N-vinylcarboxylic acid amide), a copolymer of N-vinylcarboxylic acid amide and other vinyl monomer (for example, homo- or copolymers described in Japanese Patent Application Laid-Open Nos. 247745/2001 (JP-2001-247745A), 131386/2001 (JP-2001-131386A), 311302/1996 (JP-8-311302A) and 86614/1984 (JP-59-86614A), U.S. Pat. Nos. 5,455,042, 5,407,996 and 5,338,815), and trade names "Noniolex" and "Cleatech" manufactured by Showa Denko K.K.), and others.

The nitrogen-containing compounds may be used singularly or in combination.

In one particular embodiment, the preferred nitrogen-containing compound includes a guanamine compound (e.g., adipoguanamine, and CTU-guanamine), melamine or a derivative thereof [particularly, melamine or a melamine condensate (e.g., melem, and melem)], a guanidine derivative (e.g., cyanoguanidine, and creatinine), a urea derivative [e.g., biurea, a condensate of urea with formaldehyde, allantoin, and a metal salt of allantoin (such as allantoin dihydroxyaluminum)], a hydrazine derivative (e.g., a carboxylic acid hydrazide), a nitrogen-containing resin [e.g., an amino resin (an amino resin such as a melamine resin or a melamine-formaldehyde resin; a crosslinked amino resin such as a crosslinked melamine resin), a polyamide resin, a poly(meth)acrylamide, a poly(N-vinylformamide), a poly (N-vinylcarboxylic acid amide), and a poly(vinyllactam)]. Among them, in particular, combination use of at least one member selected from the group consisting of biurea, allantoin, a metal salt of allantoin, a carboxylic acid hydrazide and a polyamide resin, and a guanamine compound having a unit represented by the above-mentioned formula (I) can bring in significant reduction of an amount of formaldehyde generated from the shaped article. The nitrogen-containing compound may be used as a resin master batch containing the compound [in particular, the carboxylic acid hydrazide (e.g., at least one member selected from the group consisting of the aliphatic carboxylic acid hydrazide and the aromatic carboxylic acid hydrazide)]. The nitrogen-containing compound [for example, the urea compound (e.g., biurea), and the carboxylic acid hydrazide (e.g., at least one member selected from the group consisting of the aliphatic carboxylic acid hydrazide and the aromatic carboxylic acid hydrazide)] may be used in the form of a master batch by melt-mixing the compound with a thermoplastic resin (e.g., a polyacetal resin, a styrenic resin, an acrylic resin, an olefinic resin, a polyamide-series resin, a polyurethane-series resin, and a polyester-series resin). The nitrogen-containing compound may be used as a resin masterbatch containing the compound.

In addition to the above components, the polymeric composition may contain various other additives and ingredients. For instance, the composition may contain heat stabilizers, processing aids, gloss agents, and fillers.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm.

The polymer composition of the present disclosure can be used to make many different types of molded articles. Molded articles that may be produced according to the present disclosure include clips and fasteners. In one embodiment, for instance, the polymer composition may be used to produce automotive parts configured to be located within an interior of a vehicle. Such automotive parts can include, for instance, trim bezels, handles, and the like.

The molded articles can be produced using any suitable molding process, such as blow molding, rotational molding, or injection molding.

When injection molding, the pre-compounded composition or the individual components can be fed to a heated barrel, mixed and forced into a mold cavity. The heated barrel may comprise a single screw extruder or a twin screw extruder. While in the barrel, the composition is heated to a temperature sufficient to form a molten mixture that flows. Once forced into a mold cavity, the polymer composition cools and hardens producing the desired part. In one embodiment, injection molding can be gas assisted. For instance, non-reactive gases, such as nitrogen or supercritical gases can be used to place pressure on the molten material for forcing the material against the walls of the mold. In other embodiments, however, no such gas is needed to obtain the pressures necessary during injection into the mold.

After the portions or parts of the containment device are molded, the different portions can be attached together. In one embodiment, for instance, any suitable welding process may be used to attach the portions together. For example, the portions may be attached together using laser welding, ultrasonic welding, linear vibration, orbital vibration, hot plate welding, or spin welding.

As described above, in an alternative embodiment, articles of the present disclosure may be produced through blow molding. In general, the blow molding process begins with melting the molding composition and forming it into a parison. Single screw extruders with the appropriate screw design are used to convert the composition (usually pellets) into a homogeneous melt. Depending on the melt strength one can use the composition with the regular classic extrusion blow molding process. This applies for the composition with a max. parison length of 250 to 300 mm. For larger parison length it might be necessary to use the extrusion blow molding process with an additional accumulator head. The size of the head depends on the amount of material to form a specific container size and wall thickness.

The present disclosure may be better understood with reference to the following examples.

EXAMPLES

The following examples were conducted in order to demonstrate some of the advantages and benefits of polymer compositions made according to the present disclosure.

Examples 1 to 8

Various polymer compositions were formulated, molded into test specimens, and tested for color difference values after exposure to ultraviolet light. More particularly, a polyoxymethylene polymer was blended with different impact modifiers. In the first two examples below, the polyoxymethylene polymer was blended with an aromatic thermoplastic polyurethane elastomer. In the remaining examples, however, the polyoxymethylene polymer was blended with an aliphatic thermoplastic polyurethane elastomer. In addition, a light stabilizing package comprising an ultraviolet light absorber and a hindered amine light stabilizer were added to various formulations.

After the polymer compositions were molded into plaques, the plaques were then exposed to ultraviolet light in a weatherometer using a xenon arc lamp. The plaques were tested according to Volkswagen Test Method PV 1303 up to ten cycles. Color difference values were measured after two cycles, after five cycles and after ten cycles.

The following compositions were tested and the following results were obtained:

polyurethane elastomers. The polyoxymethylene polymer used included hydroxy functional endgroups. Each thermoplastic polyurethane elastomer was added to the polyoxymethylene polymer in an amount of 9% by weight and in an amount of 18% by weight. Further, for each thermoplastic polyurethane elastomer, tests were run without the presence of a coupling agent or with the presence of an aromatic coupling agent, namely 4,4' diphenylmethane diisocyanate (MDI). The coupling agent, when present, was added in amount 0.5% by weight.

The polyoxymethylene polymer had a melt volume flow rate of about 9 cm$^3$/10 min. Each composition also contained various additives. In particular, the compositions contained 0.3% by weight of a sterically hindered phenolic antioxidant (IRGANOX 1010 available from Ciba Specialty Chemicals, Inc.), 0.15% by weight N,N'-bisstearoylethylenediamine, 0.5% by weight of a benzotriazole (UV absorber), 0.5% by

| Ingredient | Example 1 | Example 2 | Example 3 | Example 4 | Example 5 | Example 6 | Example 7 | Example 8 |
|---|---|---|---|---|---|---|---|---|
| Polyoxymethylene polymer | 76.94 | 75.94 | 76.94 | 75.94 | 76.94 | 75.94 | 76.94 | 75.94 |
| Color masterbatch (light gray) | 4.76 | 4.76 | 4.76 | 4.76 | 4.76 | 4.76 | 4.76 | 4.76 |
| Aromatic thermoplastic polyurethane | 18.00 | 18.00 | | | | | | |
| Aliphatic thermoplastic polyurethane (Shore A hardness of 72) | | | 18.00 | 18.00 | | | | |
| Aliphatic thermoplastic polyurethane containing carbonate groups (Shore A hardness of 84) | | | | | 18.00 | 18.00 | | |
| Aliphatic thermoplastic polyurethane (Shore A hardness of 87) | | | | | | | 18.00 | 18.00 |
| Pentaerythritol tetrakis (3-(3,5-di-tert-butyl-4-hydroxyphenyl)propionate) | 0.30 | 0.30 | 0.30 | 0.30 | 0.30 | 0.30 | 0.30 | 0.30 |
| Benzotriazole | | 0.50 | | 0.50 | | 0.50 | | 0.50 |
| Hindered amine light stabilizer | | 0.50 | | 0.50 | | 0.50 | | 0.50 |
| Total | 100.00 | 100.00 | 100.00 | 100.00 | 100.00 | 100.00 | 100.00 | 100.00 |
| DEcmc after 2 cycles | 17.55 | 13.03 | 0.50 | 0.39 | 0.48 | 0.43 | 0.50 | 0.39 |
| DEcmc after 5 cycles | 16.10 | 13.90 | 0.25 | 0.47 | 0.53 | 0.61 | 0.43 | 0.66 |
| DEcmc after 10 cycles | 17.00 | 11.64 | 9.74 | 3.12 | 1.42 | 0.70 | 0.45 | 0.77 |

As shown above, Examples 3-8 demonstrated dramatically improved ultraviolet light stability in comparison to Examples 1 and 2. Examples 3-8 all displayed color difference values of less than 1, particularly less than 0.7, and even less than about 0.5 after two cycles. After five cycles, Example Nos. 3-8 displayed a color difference value of less than 1, and particularly less than about 0.7.

As shown in the table above, the specimens produced were light gray in color. Light gray is deemed to be difficult to stabilize when exposed to ultraviolet light as the smallest color change is visually apparent.

Examples 9 to 32

The procedure described in Example 1 was repeated using different polymer formulations. In particular, a polyoxymethylene polymer was blended with different thermoplastic weight of an N-methylated hindered amine light stabilizer, and 4.76% by weight of a color master batch light gray.

Six different thermoplastic polyurethane elastomers were tested. In one set of tests, the thermoplastic polyurethane elastomer was aromatic. In the remaining tests, however, an aliphatic thermoplastic polyurethane elastomer was used. The polymer compositions were molded into specimens and then tested according to Volkswagen Test Method PV1303 as described in Example 1. In this example, color difference values were measured after five cycles.

FIG. 1 illustrates the results. As shown, the compositions containing an aliphatic thermoplastic polyurethane elastomer displayed dramatically improved color difference results. As also shown in FIG. 1, the presence of the aromatic coupling agent adversely effected color difference values.

|  |  |  | MVR 190° C./ 2.16 kg ISO 1133 cm³/10 min | Formaldehyde emission VDA 275 mg/kg | Elongation at break (with weld) ISO 527 % | Charpy notched impact at 23° C. ISO 179/1eA kJ/m² | Charpy notched impact at −30° C. ISO 179/1eA kJ/m² | Hot light fastness after 2 cycles PV1303 Decmc | Hot light fastness after 5 cycles PV1303 Decmc | Hot light fastness after 10 cycles PV1303 Decmc |
|---|---|---|---|---|---|---|---|---|---|---|
| Example 9 | \ | 9% Aromatic polyester based TPU (83 Shore A) | 8.0 | 4.5 | 4.7 | 9.6 | 7.2 | 7.9 | 9.1 | 6.2 |
| Example 10 | \ | 9% Aliphatic polyester based TPU (86 Shore A) | 8.2 | 3.3 | 4.2 | 8.0 | 7.7 | 0.7 | 0.9 | 0.9 |
| Example 11 | \ | 9% Aliphatic polyester based TPU (80 Shore A) | 7.1 | 4.7 | 6.6 | 10.5 | 8.1 | 1.0 | 1.1 | 0.8 |
| Example 12 | \ | 9% Aliphatic Polyether-ester Hybrid TPU (85 shore A) | 7.6 | 2.7 | 4.1 | 8.9 | 8.7 | 0.41 | 0.7 | 0.8 |
| Example 13 | \ | 9% Aliphatic polycarbonate based TPU (84 Shore A) | 7.2 | 5.3 | 1.9 | 8.2 | 5.5 | 0.3 | 1.0 | 2.1 |
| Example 14 | \ | 9% Aliphatic Polyether based TPU (72 shore A) | 9.1 | 5.0 | 6.6 | 7.8 | 6.3 | 0.3 | 1.0 | 6.1 |
| Example 15 | 0.50% MDI | 9% Aromatic polyester based TPU (83 Shore A) | 6.5 | 4.2 | 4.1 | 9.5 | 8.3 | 8.5 | 9.4 | 7.7 |
| Example 16 | 0.50% MDI | 9% Aliphatic polyester based TPU (86 Shore A) | 6.5 | 3.2 | 4.8 | 10.1 | 7.8 | 2.3 | 2.4 | 3.6 |
| Example 17 | 0.50% MDI | 9% Aliphatic polyester based TPU (80 Shore A) | 5.6 | 4.0 | 4.1 | 11.0 | 8.5 | 3.0 | 2.6 | 2.2 |
| Example 18 | 0.50% MDI | 9% Aliphatic Polyether-ester Hybrid TPU (85 shore A) | 5.0 | 5.0 | 4.5 | 12.2 | 9.6 | 3.0 | 2.8 | 2.5 |
| Example 19 | 0.50% MDI | 9% Aliphatic polycarbonate based TPU (84 Shore A) | 5.6 | 5.1 | 5.7 | 11.7 | 6.0 | 2.2 | 2.6 | 4.6 |
| Example 20 | 0.50% MDI | 9% Aliphatic Polyether based TPU (72 shore A) | 6.9 | 5.9 | 9.0 | 10.4 | 7.7 | 2.3 | 6.6 | 11.5 |
| Example 21 | \ | 18% Aromatic polyester based TPU (83 Shore A) | 7.2 | 4.7 | 3.2 | 9.2 | 5.5 | 12.9 | 13.8 | 11.3 |
| Example 22 | \ | 18% Aliphatic polyester based TPU (86 Shore A) | 8.0 | 3.5 | 2.5 | 8.0 | 6.9 | 0.7 | 0.8 | 0.7 |
| Example 23 | \ | 18% Aliphatic polyester based TPU (80 Shore A) | 4.2 | 5.1 | 1.9 | 13.3 | 8.8 | 0.8 | 1.2 | 1.1 |
| Example 24 | \ | 18% Aliphatic Polyether-ester Hybrid TPU (85 shore A) | 7.5 | 3.0 | 3.9 | 9.6 | 7.9 | 0.68 | 0.8 | 0.6 |
| Example 25 | \ | 18% Aliphatic polycarbonate based TPU (84 Shore A) | 5.7 | 6.8 | 1.9 | 7.9 | 3.4 | 0.5 | 1.4 | 1.8 |
| Example 26 | \ | 18% Aliphatic Polyether based TPU (72 shore A) | 9.3 | 6.8 | 3.1 | 6.7 | 4.3 | 0.49 | 0.7 | 0.7 |
| Example 27 | 0.50% MDI | 18% Aromatic polyester based TPU (83 Shore A) | 6.2 | 4.0 | 3.0 | 8.6 | 5.5 | 12.1 | 13.9 | 11.9 |
| Example 28 | 0.50% MDI | 18% Aliphatic polyester based TPU (86 Shore A) | 6.0 | 3.8 | 3.0 | 10.4 | 7.0 | 2.7 | 2.8 | 2.5 |
| Example 29 | 0.50% MDI | 18% Aliphatic polyester based TPU (80 Shore A) | 3.0 | 4.1 | 3.1 | 14.2 | 10.2 | 4.8 | 4.9 | 4.1 |
| Example 30 | 0.50% MDI | 18% Aliphatic Polyether-ester Hybrid TPU (85 shore A) | 5.2 | 5.5 | 4.4 | 11.8 | 8.9 | 2.8 | 2.9 | 2.8 |
| Example 31 | 0.50% MDI | 18% Aliphatic polycarbonate based TPU (84 Shore A) | 3.8 | 7.3 | 2.9 | 9.0 | 5.4 | 2.9 | 3.2 | 6.1 |
| Example 32 | 0.50% MDI | 18% Aliphatic Polyether based TPU (72 shore A) | 7.9 | 5.9 | 3.9 | 7.0 | 5.9 | 2.8 | 2.7 | 1.6 |

Examples 33-41

In these examples, various polymer compositions were formulated containing a polyoxymethylene polymer. The polyoxymethylene polymer used included hydroxy functional endgroups. The polymer compositions contained a thermoplastic polyurethane elastomer and optionally a coupling agent. The type and amount of coupling agent was varied and the compositions were tested for melt flow volume rate according to ISO Test 1133 at a temperature of 190° C. and at a load of 2.16 kg.

The coupling agents used were 4,4' diphenylmethane diisocyanate (MDI) and isophorone diisocyanate trimer (IPDI-T). MDI is an aromatic coupling agent, while IPDI-T is an aliphatic coupling agent. MDI is bifunctional while IPDI-T is trifunctional.

The following formulations were tested with the following results:

The polymer compositions all contained an aliphatic thermoplastic polyurethane elastomer in an amount of 18% by weight. The thermoplastic elastomer had a Shore A hardness of 80.

Each polymer composition contained the same pigment package, and contained ethylene bis stearamide in an amount of 0.15% by weight. Each polymer composition contained a benzotriazole, which is an ultraviolet light stabilizer. The ultraviolet light stabilizer was present in an amount of 0.5% by weight. The polymer compositions also contained a phenolic antioxidant in an amount of 0.3% by weight and a hindered amine light stabilizer in an amount of 0.5% by weight. In one set of samples, an N-methylated hindered amine light stabilizer was used ("HALS"). In a second set of samples, the hindered amine light stabilizer comprised Bis(1,2,2,6,6-pentamethyl-4-piperidinyl)-[[3,5-bis(1,1-dimethylethyl)-4-hydroxypheyl]methyl]butylmalonate ("HALS II").

| Ingredient | Example 33 | Example 34 | Example 35 | Example 36 | Example 37 | Example 38 | Example 39 | Example 40 | Example 41 |
|---|---|---|---|---|---|---|---|---|---|
| Polyoxymethylene polymer (contains hydroxyfunctional endgroups, MVR of 9.3 cm³/10 min) | 81.55 | 81.05 | 79.82 | 79.32 | 79.32 | 78.82 | 79.88 | 79.38 | 78.88 |
| Pigment Package | | | .731 | .731 | .731 | .731 | .674 | .674 | .674 |
| Aliphatic thermoplastic polyurethane (Shore A hardness of 80) | 18.00 | 18.00 | 18.00 | 18.00 | 18.00 | 18.00 | 18.00 | 18.00 | 18.00 |
| Pentaerythritol tetrakis (3-(3,5-di-tert-butyl-4-hydroxyphenyl)propionate) | 0.30 | 0.30 | 0.30 | 0.30 | 0.30 | 0.30 | 0.30 | 0.30 | 0.30 |
| Benzotriazole | — | — | 0.50 | 0.50 | 0.50 | 0.50 | 0.50 | 0.50 | 0.50 |
| N-methylated hindered amine light stabilizer | — | — | 0.50 | 0.50 | 0.50 | 0.50 | 0.50 | 0.50 | 0.50 |
| Ethylene bis stearamide | 0.15 | 0.15 | 0.15 | 0.15 | 0.15 | 0.15 | 0.15 | 0.15 | 0.15 |
| Methylene diphenyl diisocyanate | — | 0.50 | — | 0.50 | — | — | — | 0.50 | |
| Isophorone diisocyanate - Trimer | — | — | — | — | 0.50 | 1.0 | — | — | 1.0 |
| Total | 100.00 | 100.00 | 100.00 | 100.00 | 100.00 | 100.00 | 100.00 | 100.00 | 100.00 |
| DEcmc after 5 cycles | | | 1.9 | 2.6 | 2.0 | 2.0 | 2.6 | 4.6 | 2.4 |
| Gray scale after 5 cycles | | | 4 | 3 | 4 | 3-4 | 4-5 | 3 | 4 |
| DEcmc after 10 cycles | | | 3.2 | 2.6 chalking | 3.4 | 3.7 | 4.1 | 5.2 chalking | 4.6 |
| Gray scale after 5 cycles | | | 3-4 | 2 | 3 | 3 | 3-4 | 2 | 3-4 |
| Melt Flow Rate @ 190° C. and 2.16 kg (cm³/10 min) | 4.2 | 3.3 | 4.1 | 3.3 | 1.9 | 0.9 | 4.1 | 3.9 | <0.1 |

As shown above, adding a coupling agent can lower the melt flow rate of the polymer composition. The aliphatic coupling agent tends to lower the melt flow rate a greater amount than the aromatic coupling agent based on weight percentage. The aliphatic coupling agent, however, is trifunctional, while the aromatic coupling agent is bifunctional. Consequently, both coupling agents tested decreased the melt flow rate in approximately the same amount when compared on a molar basis.

The following example illustrates the effect a coupling agent may have on impact resistance.

Examples 42-51

Various polymer compositions were formulated containing a polyoxymethylene polymer. The polyoxymethylene polymer used is the same hydroxyfunctional polyoxymethylene polymer described in Examples 9-41 (MVR is 9 cm³/10 min).

The polymer compositions also contained no coupling agent, an aromatic coupling agent, or an aliphatic coupling agent. The aromatic coupling agent was MDI while the aliphatic coupling agent was IPDI-T.

Figure 2:
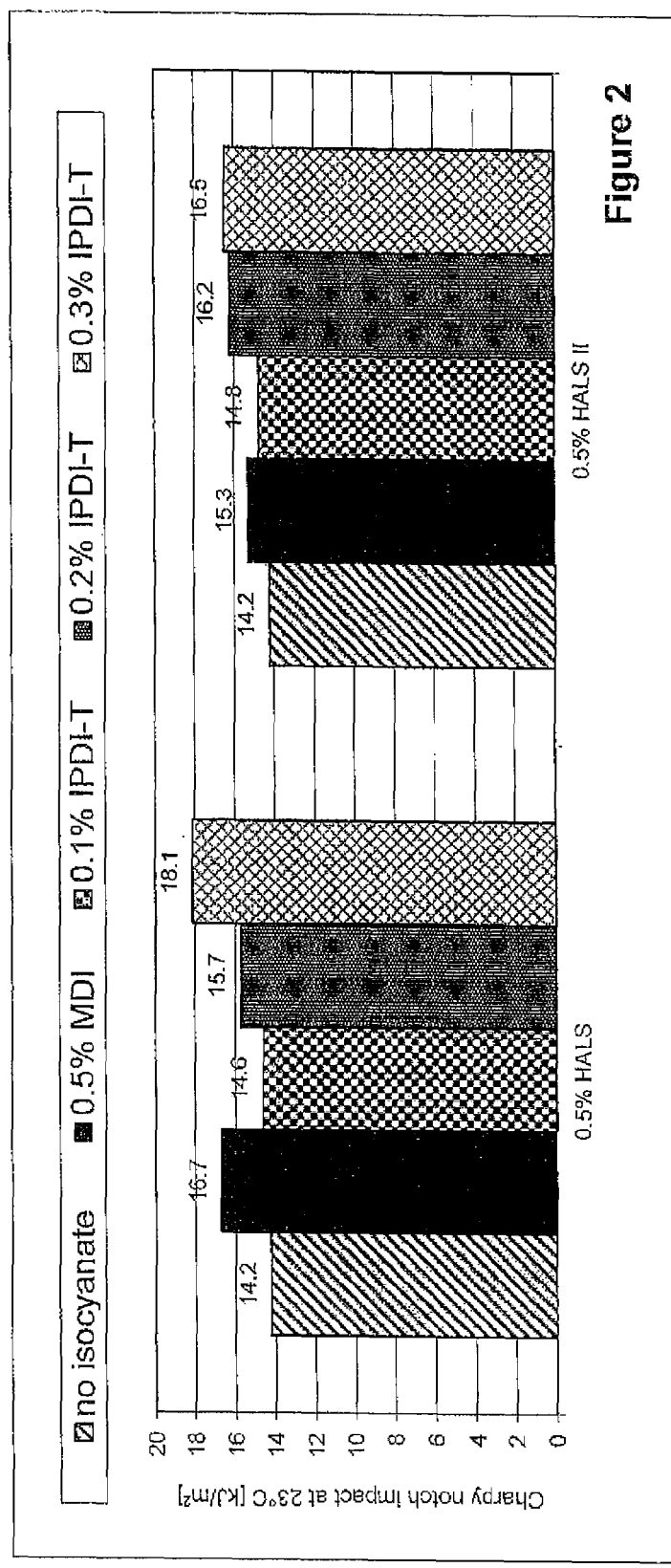
Figure 3:
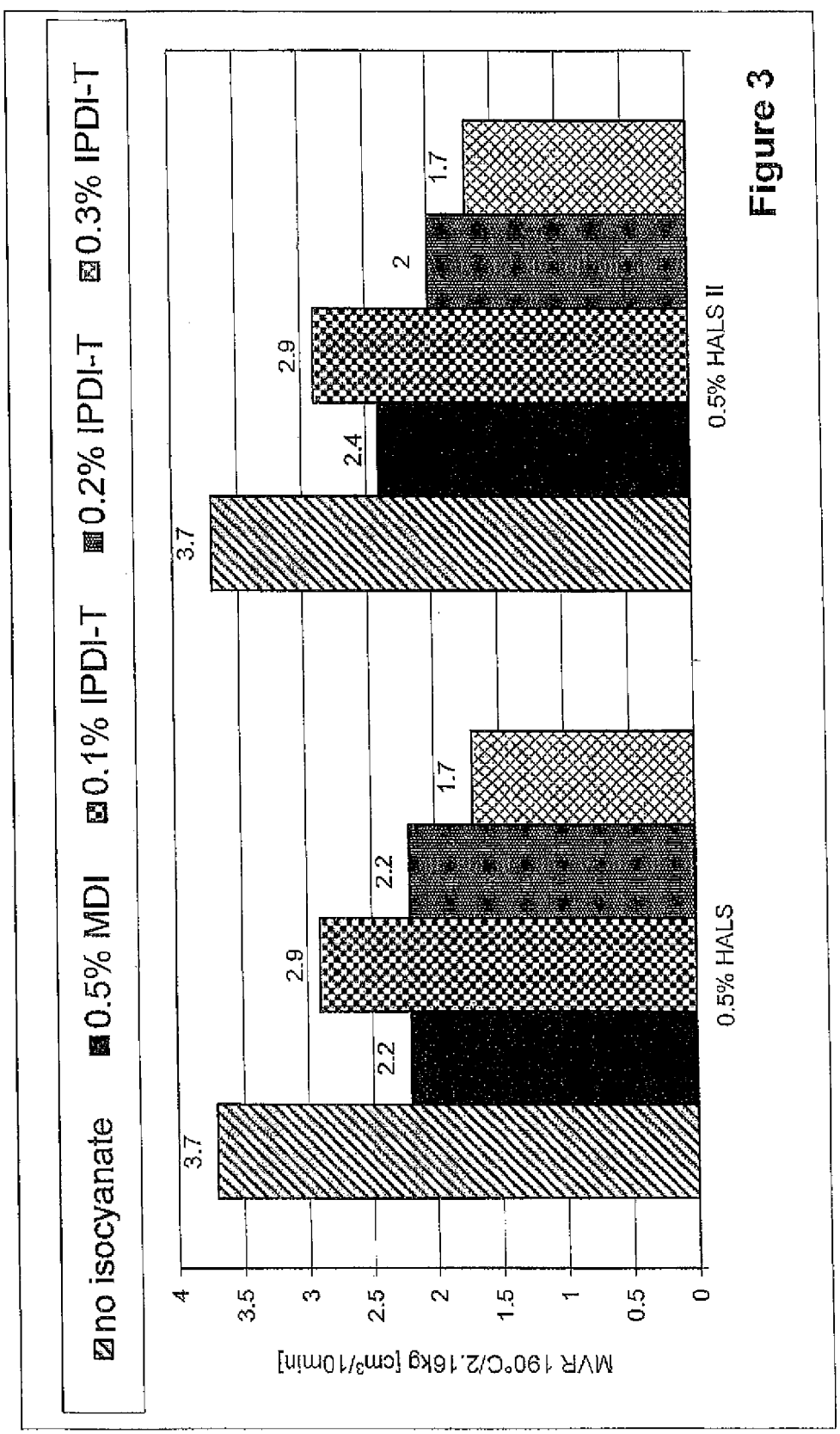

The polymer compositions were molded into ISO Test Specimens and tested for Charpy notched impact strength at 23° C. according to ISO Test 179/1 eA. The polymer compositions were also tested for melt flow rate. The results are illustrated in FIGS. 2 and 3. As shown, the use of the coupling agent can increase impact strength resistance. The best results were obtained when the aliphatic coupling agent was present in an amount of 0.3% by weight. In fact, when using an aliphatic coupling agent, the notch impact strength resistance can be greater than about 14.5 kJ/m², such as greater than 15 kJ/m², such as even greater than even 16 kJ/m².

| | 3,9-bis(2-hydroxy-1,1-dimethylethyl)-2,4,8,10-tetra-oxaspiro[5,5]undecane | Bis(1,2,2,6,6-pentamethyl-4-piperidinyl)-[[3,5-bis(1,1-dimethylethyl)-4-hydroxyphenyl]methyl]butylmalonate | MDI | IPDI-T | MVR 190° C./ 2.16 kg ISO 1133 cm³/10 min | Formaldehyde emission VDA 275 mg/kg | Elongation at break (with weld) ISO 527 % | Charpy notched impact at 23° C. ISO 179/1eA kJ/m² | Charpy notched impact at −30° C. ISO 179/1eA kJ/m² |
|---|---|---|---|---|---|---|---|---|---|
| Example 42 | 0.5 | | | | 3.7 | 7.8 | 3.4 | 14.2 | 9.2 |
| Example 43 | | 0.5 | | | 3.7 | 6.2 | 3.6 | 14.2 | 9.0 |
| Example 44 | 0.5 | | 0.5 | | 2.2 | 7.3 | 3.7 | 16.7 | 12.3 |
| Example 45 | | 0.5 | 0.5 | | 2.4 | 7.1 | 3.5 | 15.3 | 10.3 |
| Example 46 | 0.5 | | | 0.1 | 2.9 | 6.2 | 4.4 | 14.6 | 7.5 |
| Example 47 | | 0.5 | | 0.1 | 2.9 | 4.6 | 4.5 | 14.8 | 10.2 |
| Example 48 | 0.5 | | | 0.2 | 2.2 | 6.8 | 4.0 | 15.7 | 10.1 |
| Example 49 | | 0.5 | | 0.2 | 2.0 | 5.1 | 3.6 | 16.2 | 11.2 |
| Example 50 | 0.5 | | | 0.3 | 1.7 | 5.4 | 3.2 | 18.1 | 10.4 |
| Example 51 | | 0.5 | | 0.3 | 1.7 | 5.1 | 3.2 | 16.5 | 9.9 |

Examples 52-69

Polymer compositions similar to the polymer compositions described in Examples 42-51 above were formulated and tested for color retention after UV exposure, notch impact strength, elongation at break, and formaldehyde emission.

The polymer compositions contained either no coupling agent, an aromatic coupling agent (MDI) or an aliphatic coupling agent (IPDI-T). The aliphatic coupling agent was present in an amount of 0.2% by weight, while the aromatic coupling agent was present in an amount of 0.5% by weight, which represents a similar molar equivalence.

Figure 4:
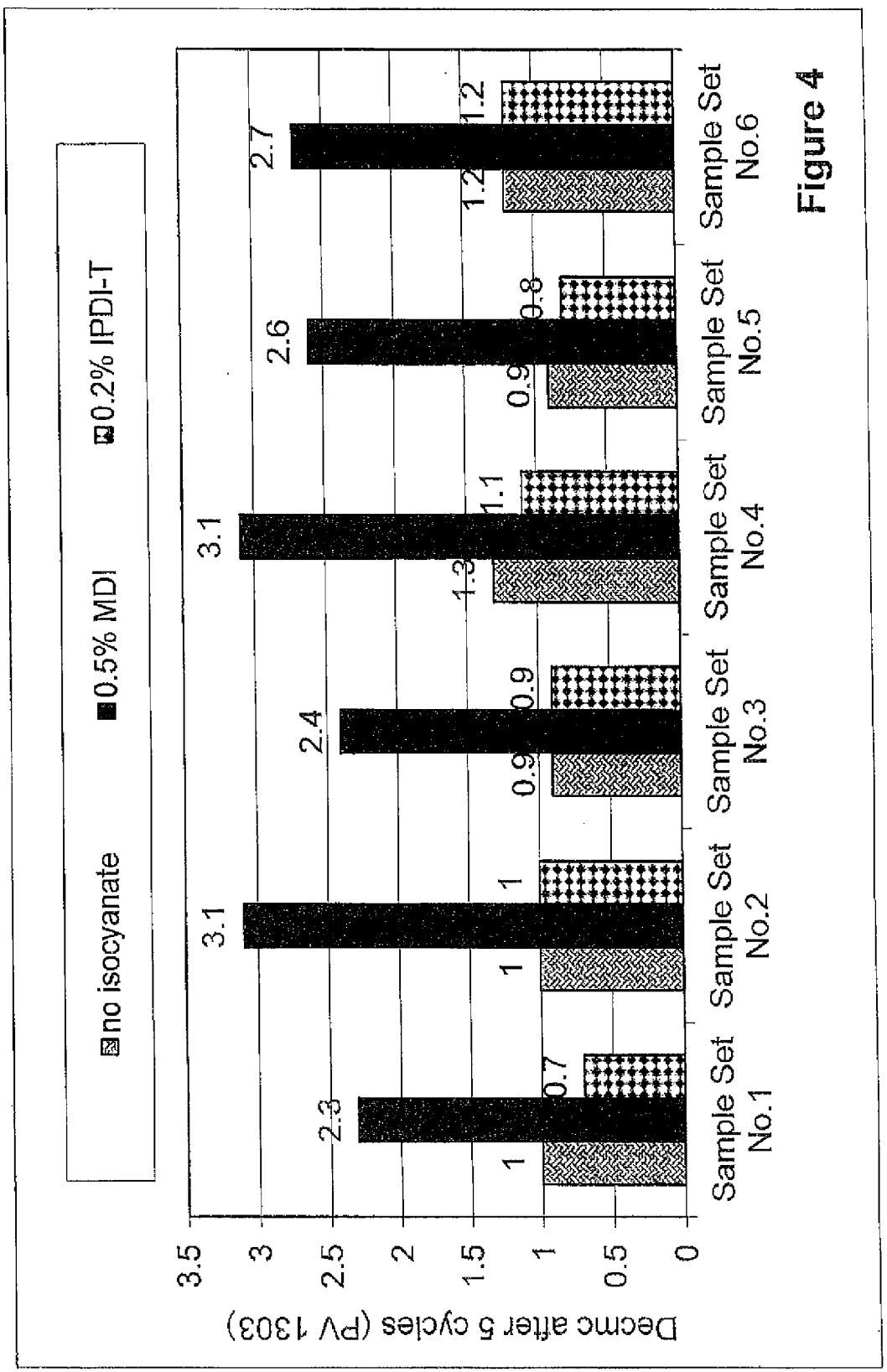
Figure 5:
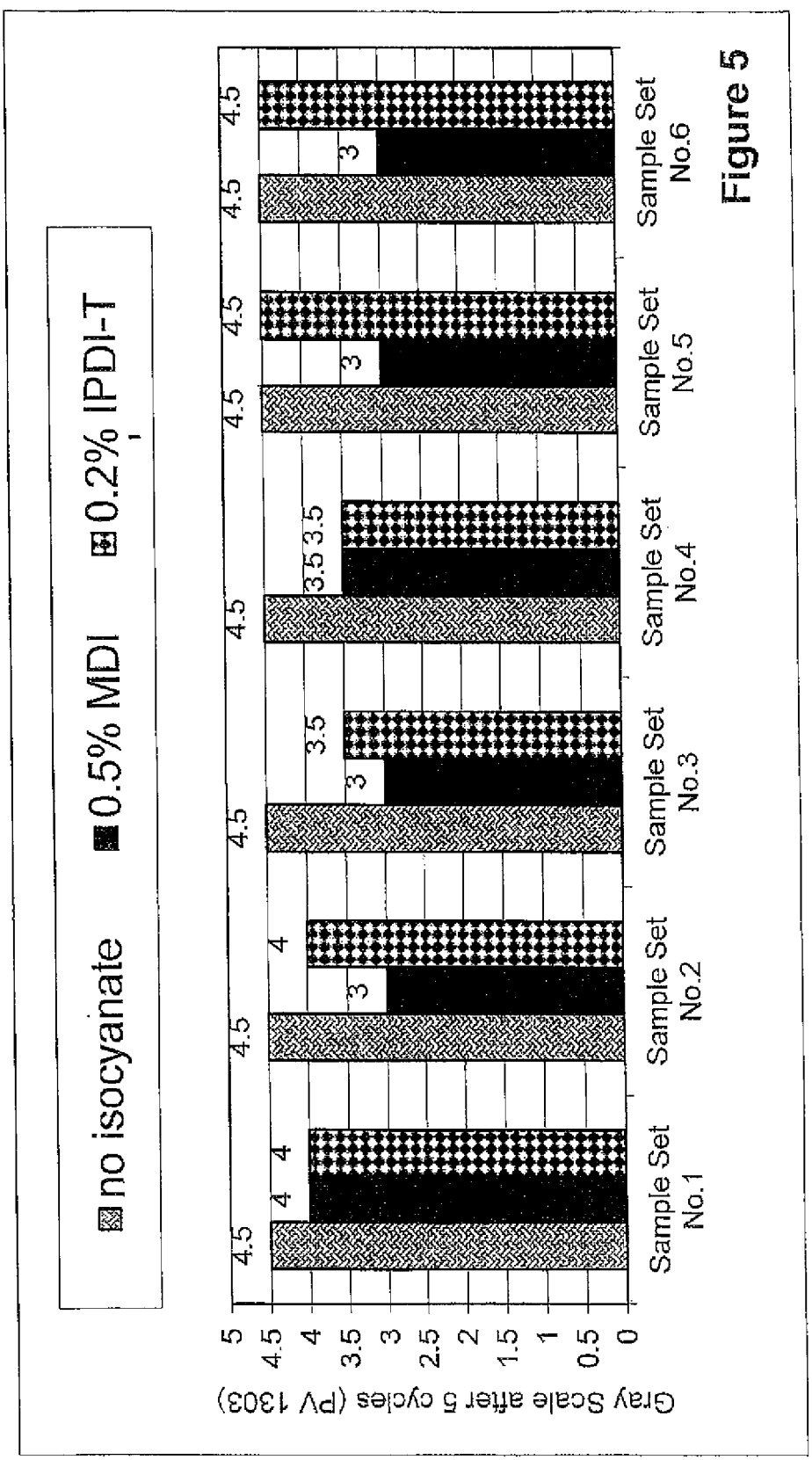
Figure 6:
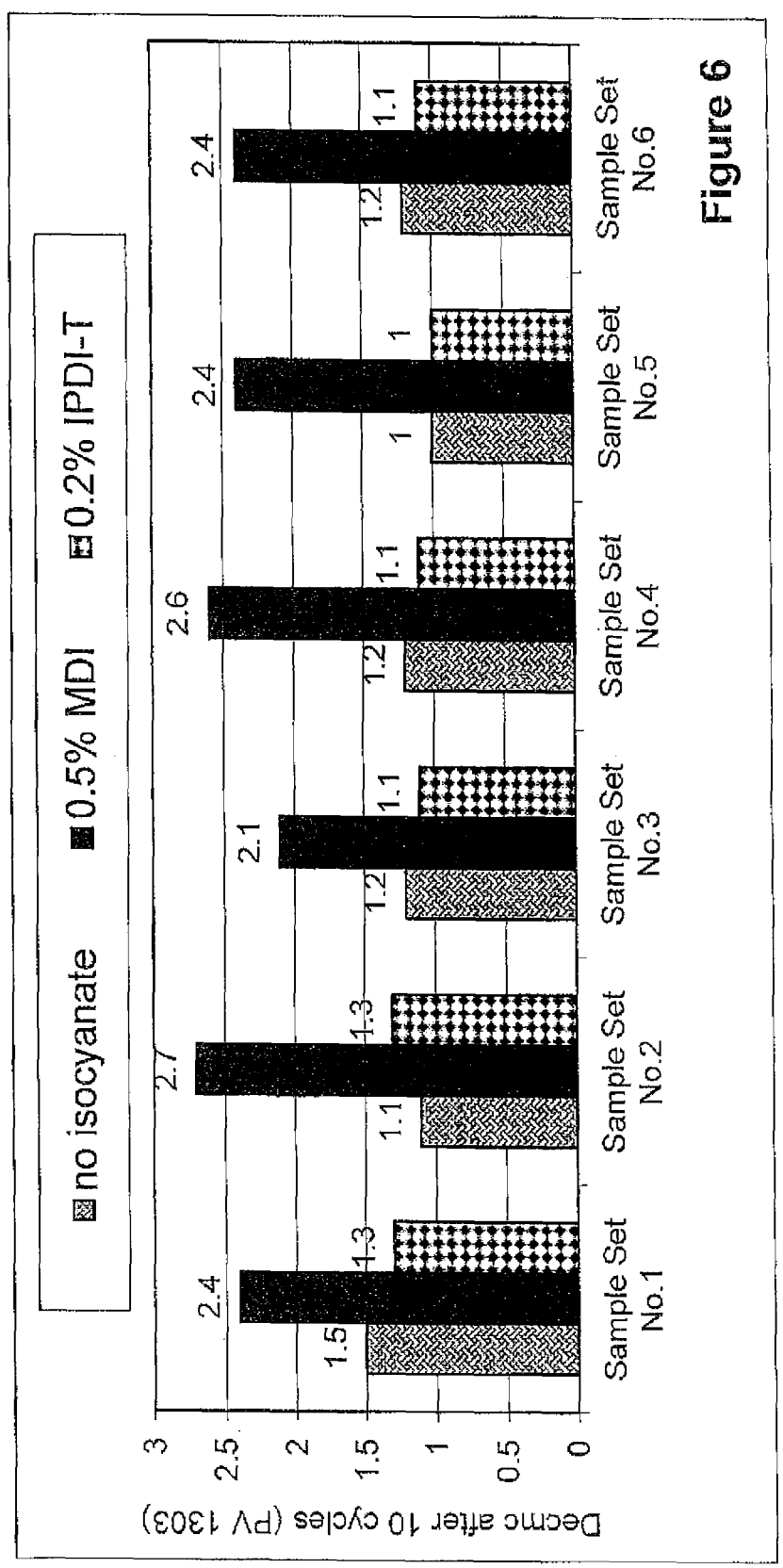
Figure 7:
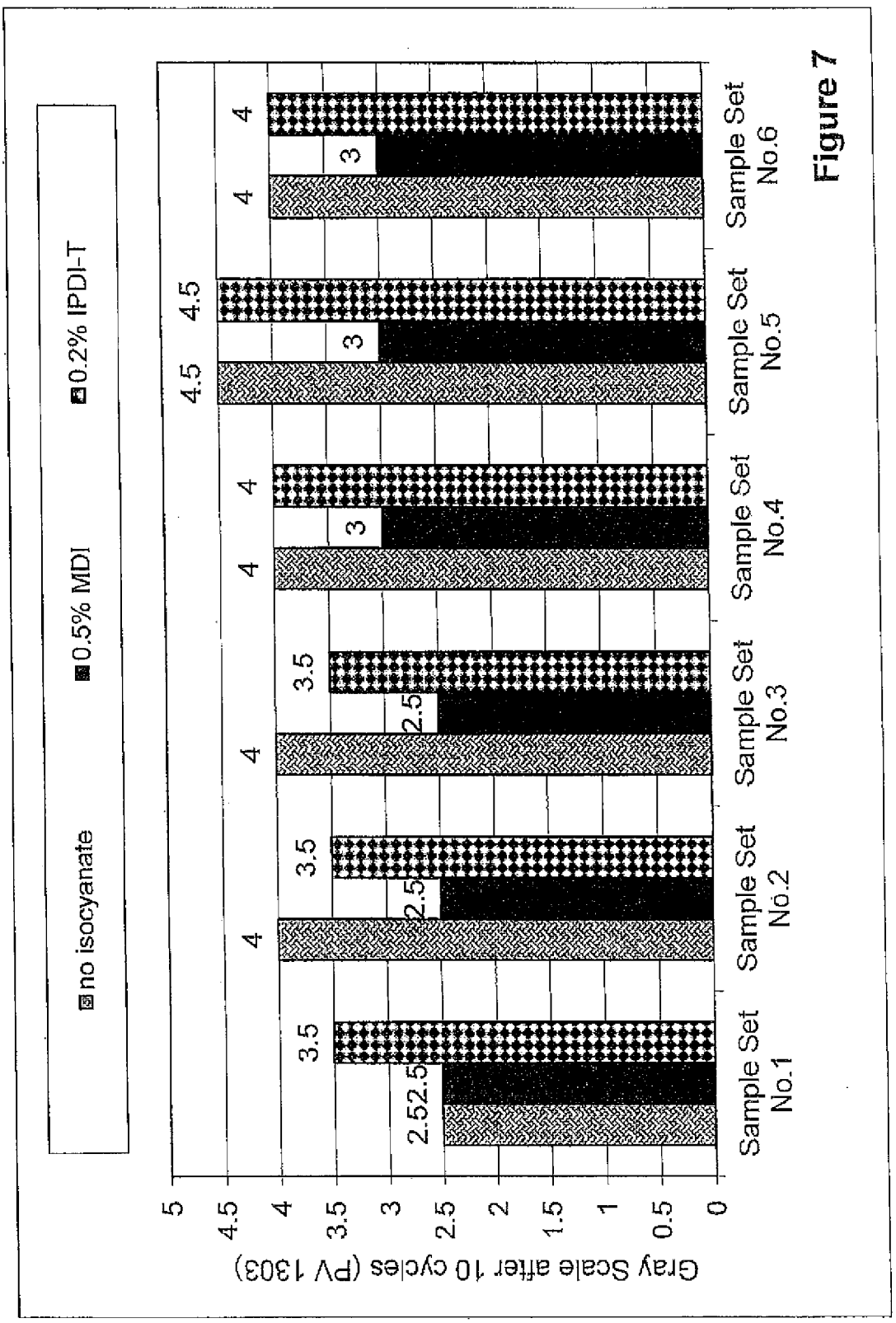

The samples contained the same polyoxymethylene polymer described in Examples 42-51 and generally the same additives in the same amounts except as discussed below. Each sample contained an aliphatic thermoplastic polyurethane elastomer in an amount of 18% by weight. The thermoplastic polyurethane elastomer had polyester soft segments and had a hardness of Shore 80A. Each set of samples, contained either no hindered amine light stabilizer, a single hindered amine light stabilizer, or a combination of two hindered amine light stabilizers. In particular, the following sample sets were tested:
Sample Set 1: No hindered amine light stabilizer
Sample Set 2: 0.5% by weight Bis (2,2,6,6,-tetramethyl-4-piperidyl) sebaceate
Sample Set 3: 0.5% by weight N-methylated hindered amine light stabilizer
Sample Set 4: Bis(1,2,2,6,6-pentamethyl-4-piperidinyl)-[[3,5-bis(1,1-dimethylethyl)-4-hydroxypheyl]methyl]butylmalonate
Sample Set 5: 0.5% by weight butane dioic acid, dimethylester, polymer with 4-hydroxy-2,2,6,6-tetramethyl-1-piperidine ethanol
Sample Set 6: 0.5% Bis(1,2,2,6,6-pentamethyl-4-piperidinyl)-[[3,5-bis(1,1-dimethylethyl)-4-hydroxypheyl]methyl] butylmalonate and 0.5% by weight butane dioic acid, dimethylester, polymer with 4-hydroxy-2,2,6,6-tetramethyl-1-piperidine ethanol The polymer compositions were then used to mold samples that were subjected to various tests. For instance, the polymer compositions were tested according to Volkswagen Test Method PV 1303 as described in Example 1. The results are illustrated in FIGS. 4-7. In FIGS. 4 and 6, color difference values are shown. In FIGS. 5 and 7, on the other hand, grayscale values are shown.

As shown in the Figures, the use of an aliphatic coupling agent dramatically and overwhelmingly improves the color retention properties of the composition in comparison to compositions containing an aromatic coupling agent.

Figure 8:
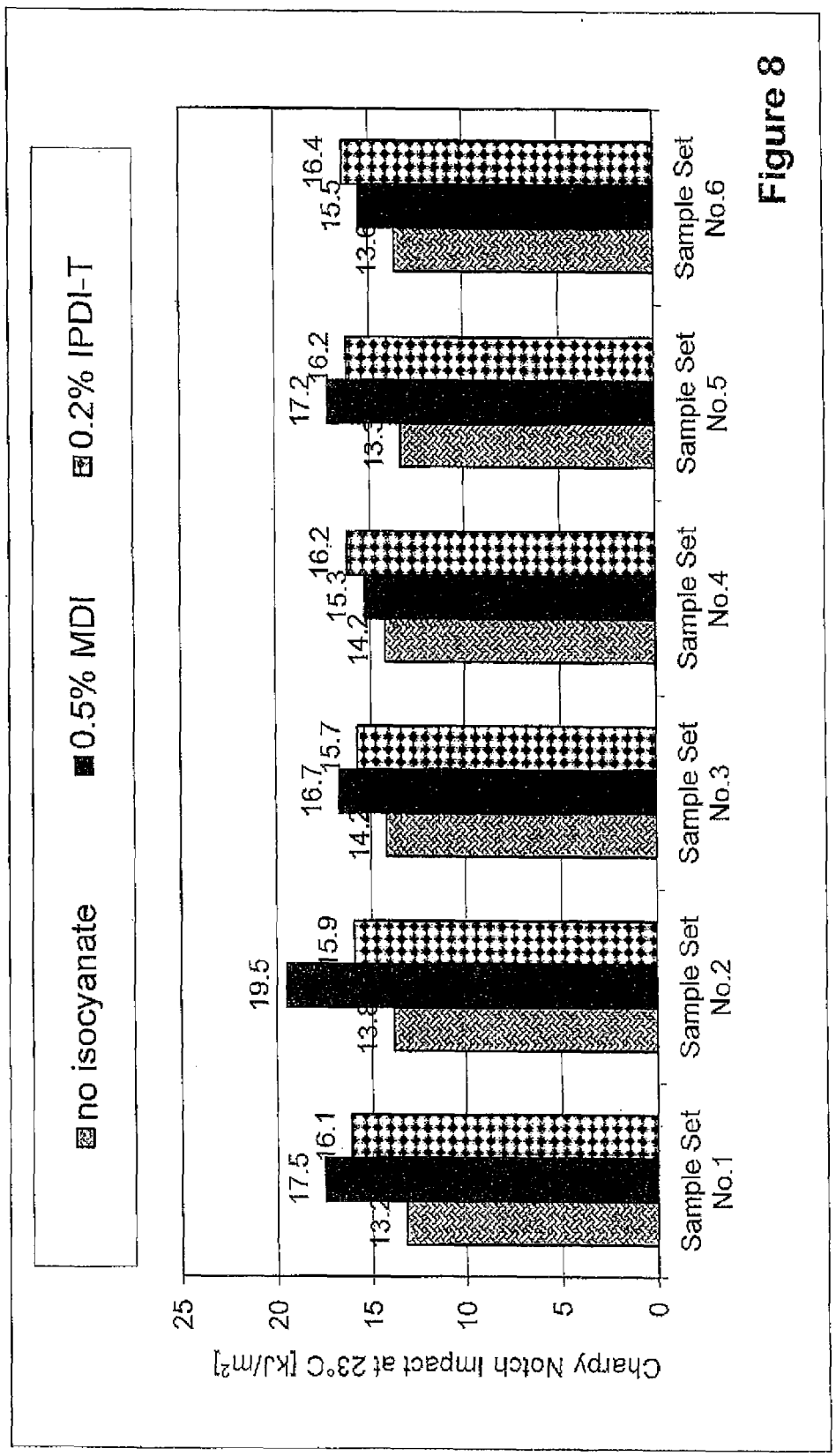
Figure 9:
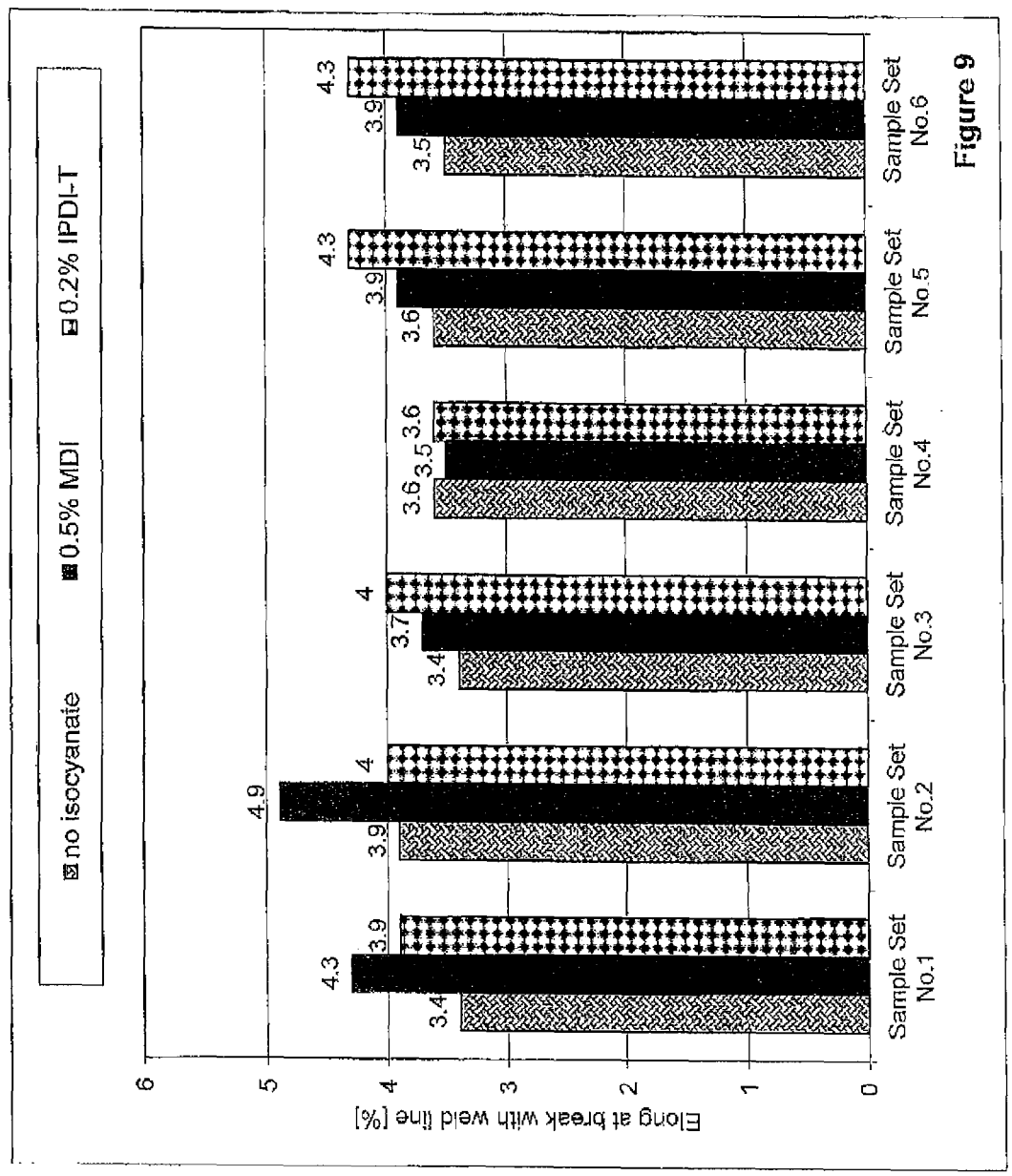

The polymer compositions were also tested for various physical properties. In this regard, FIG. 8 is a graphical representation of the impact resistance of the compositions, while FIG. 9 is a graphical representation of the elongation-at-break properties. The elongation-at-break properties were tested according to ISO Test 527.

Figure 10:
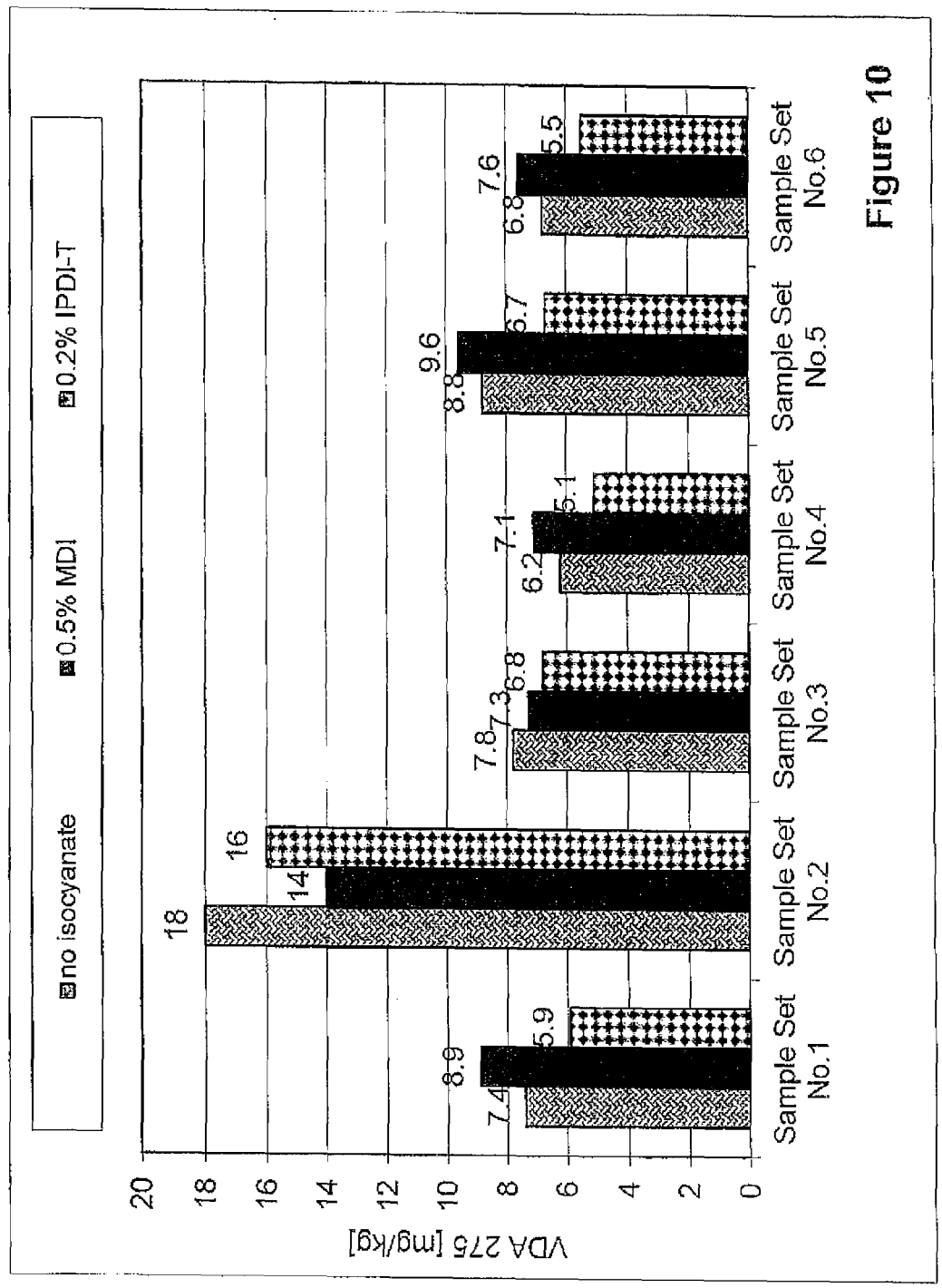

The polymer compositions were also tested for formaldehyde emission according to VDA Test 275. The results are illustrated in FIG. 10. As shown, the use of an aliphatic isocyanate coupling agent unexpectedly reduced formaldehyde emission. With respect to formaldehyde emission, even small decreases in emission levels can be dramatic when the composition is used in commercial applications.

| | Tinuvin 770 | ADK STAB LA-63P | Tinuvin 144 | Tinuvin 622 | MDI | IPDI-T | MVR 190° C./ 2.16 kg ISO 1133 cm³/10 min | Formaldehyde emission VDA 275 intern Keba mg/kg |
|---|---|---|---|---|---|---|---|---|
| Example 52 | | | | | | | 3.9 | 7.4 |
| Example 53 | | | | | 0.5 | | 1.7 | 8.9 |
| Example 54 | | | | | | 0.2 | 2.2 | 5.9 |

-continued

| | | | | | | | | |
|---|---|---|---|---|---|---|---|---|
| Example 55 | 0.5 | | | | | | 3.7 | 18 |
| Example 56 | 0.5 | | | | 0.5 | | 2.1 | 14 |
| Example 57 | 0.5 | | | | | 0.2 | 2.2 | 16 |
| Example 58 | | 0.5 | | | | | 3.7 | 7.8 |
| Example 59 | | 0.5 | | | 0.5 | | 2.2 | 7.3 |
| Example 60 | | 0.5 | | | | 0.2 | 2.2 | 6.8 |
| Example 61 | | | 0.5 | | | | 3.7 | 6.2 |
| Example 62 | | | 0.5 | | 0.5 | | 2.4 | 7.1 |
| Example 63 | | | 0.5 | | | 0.2 | 2.0 | 5.1 |
| Example 64 | | | | 0.5 | | | 3.9 | 8.8 |
| Example 65 | | | | 0.5 | 0.5 | | 2.1 | 9.6 |
| Example 66 | | | | 0.5 | | 0.2 | 2.4 | 6.7 |
| Example 67 | | | 0.5 | 0.5 | | | 3.8 | 6.8 |
| Example 68 | | 0.5 | 0.5 | 0.5 | | | 2.3 | 7.6 |
| Example 69 | | | 0.5 | 0.5 | | 0.2 | 2.5 | 5.5 |

| | Elongation at break (with weld) ISO 527 % | Charpy notched impact at 23° C. ISO 179/1eA kJ/m$^2$ | Charpy notched impact at −30° C. ISO 179/1eA kJ/m$^2$ | Hot light fastness after 5 cycles PV1303 DEcmc | Hot light fastness after 10 cycles PV1303 DEcmc | Hot light fastness after 5 cycles PV1303 Gray Scale | Hot light fastness after 10 cycles PV1303 Gray Scale |
|---|---|---|---|---|---|---|---|
| Example 52 | 3.4 | 13.2 | 9.1 | 1.0 | 1.5 | 4-5 | 2-3 |
| Example 53 | 4.3 | 17.5 | 11.4 | 2.3 | 2.4 | 4.0 | 2-3 |
| Example 54 | 3.9 | 16.1 | 10.7 | 0.7 | 1.3 | 4.0 | 3-4 |
| Example 55 | 3.9 | 13.8 | 9.2 | 1.0 | 1.1 | 4-5 | 4.0 |
| Example 56 | 4.9 | 19.5 | 11.6 | 3.1 | 2.7 | 3.0 | 2-3 |
| Example 57 | 4.0 | 15.9 | 11.2 | 1.0 | 1.3 | 4.0 | 3-4 |
| Example 58 | 3.4 | 14.2 | 9.2 | 0.9 | 1.2 | 4-5 | 4.0 |
| Example 59 | 3.7 | 16.7 | 12.3 | 2.4 | 2.1 | 3.0 | 2-3 |
| Example 60 | 4.0 | 15.7 | 10.1 | 0.9 | 1.1 | 3-5 | 3-4 |
| Example 61 | 3.6 | 14.2 | 9.0 | 1.3 | 1.2 | 4-5 | 4.0 |
| Example 62 | 3.5 | 15.3 | 10.3 | 3.1 | 2.6 | 3-5 | 3.0 |
| Example 63 | 3.6 | 16.2 | 11.2 | 1.1 | 1.1 | 3-5 | 4.0 |
| Example 64 | 3.6 | 13.3 | 9.0 | 0.9 | 1.0 | 4-5 | 4.5 |
| Example 65 | 3.9 | 17.2 | 9.2 | 2.6 | 2.4 | 3.0 | 3.0 |
| Example 66 | 4.3 | 16.2 | 10.0 | 0.8 | 1.0 | 4-5 | 4.5 |
| Example 67 | 3.5 | 13.6 | 8.8 | 1.2 | 1.2 | 4-5 | 4.0 |
| Example 68 | 3.9 | 15.5 | 11.3 | 2.7 | 2.4 | 3.0 | 3.0 |
| Example 69 | 4.3 | 16.4 | 9.9 | 1.2 | 1.1 | 4-5 | 4.0 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising a polyoxymethylene polymer and an impact modifier, the polyoxymethylene polymer being present in the polymer composition in an amount of at least about 40% by weight, the polyoxymethylene polymer containing terminal hydroxyl groups in an amount of at least 15 mmol/kg and less than about 10% by weight of constituents having a molecular weight below about 10,000 Dalton, wherein the impact modifier comprising an aliphatic impact modifier, the aliphatic impact modifier comprising an aliphatic thermoplastic polyurethane elastomer, the aliphatic thermoplastic polyurethane elastomer containing polycarbonate groups, the polymer composition further containing at least one hindered amine light stabilizer, an ultraviolet light absorber, and a coupling agent, the coupling agent comprising an aliphatic isocyanate coupling agent, the polymer composition further containing a coloring agent sufficient for a molded article made from the composition to exhibit a color, the color having an L* value of greater than 25, the polymer composition exhibiting a color difference value (DEcmc) of less than about eight after exposure to five cycles of 280 kJ/m$^2$ irradiation per cycle in a xenon arc weatherometer operated according to Volkswagen Test PV 1303, the aliphatic isocyanate coupling agent being present in the polymer composition in an amount such that the polymer composition has a formaldehyde emission of less than 7 mg/kg when tested according to VDA 275 and wherein the polymer composition has a Charpy notched impact strength of from about 3 kJ/m$^2$ to about 25 kJ/m$^2$ at −30° C. according to ISO Test 179/1eA.

2. A polymer composition as defined in claim 1, wherein the color has an L* value of greater than about 30.

3. A polymer composition as defined in claim 1, wherein the ultraviolet light absorber comprises a benzotriazole.

4. A polymer composition as defined in claim 1, wherein the polymer composition exhibits a green color, a red color, a brown color, a gray color, a purple color, a white color, a black color or a blue color when molded.

5. A polymer composition as defined in claim 1, wherein the impact modifier is present in the polymer composition in an amount from about 5% to about 40% by weight.

6. A polymer composition as defined in claim 1, wherein the polymer composition has a Charpy notched impact strength of at least about 4 kJ/m$^2$ at −30° C.

7. A polymer composition as defined in claim 1, wherein the polymer composition has a Charpy notched impact strength of at least about 6 kJ/m$^2$ at 23° C.

8. A polymer composition as defined in claim 1, wherein the polymer composition exhibits a color difference value (DECMC) of less than about 10 after exposure to ten cycles of 280 kJ/m$^2$ irradiation per cycle in a xenon arc weatherometer operated according to Volkswagen Test PV 1303.

9. A polymer composition as defined in claim 1, wherein the polyoxymethylene has a melt flow rate at 190° C. and at a load of 2.16 kg of from about 7 cm$^3$/10 minutes to about 30 cm$^3$/10 minutes.

10. A polymer composition as defined in claim 1, wherein the polymer composition exhibits a gray scale value of at least about 3, after exposure to five cycles of 280 kJ/m$^2$ irradiation per cycle in a xenon arc weatherometer operated according to Volkswagen Test PV 1303.

11. A polymer composition as defined in claim 1, wherein the impact modifier is present in the polymer composition in an amount from about 15% to about 25% by weight.

12. A polymer composition as defined in claim 1, wherein the impact modifier comprises a polyester-based thermoplastic polyurethane elastomer.

13. A polymer composition as defined in claim 1, wherein the polymer composition further comprises a sterically hindered phenolic antioxidant.

14. A polymer composition as defined in claim 1, wherein the hindered amine light stabilizer comprises Bis(1,2,2,6,6-pentamethyl-4-piperidinyl)-[[3,5-bis(1,1-dimethylethyl)-4-hydroxyphenyl]methyl] butylmalonate.

15. A polymer composition as defined in claim 1 wherein the polyoxymethylene polymer has an initial formaldehyde content of less than about 1,000 ppm.

16. A polymer composition comprising a polyoxymethylene polymer and an impact modifier, the polyoxymethylene polymer being present in the polymer composition in an amount of at least about 40% by weight, the polyoxymethylene polymer containing terminal hydroxyl groups in an amount of at least 15 mmol/kg and less than about 10% by weight of constituent having a molecular weight below about 10,000 Dalton, wherein the impact modifier comprising an aliphatic impact modifier, the aliphatic impact modifier comprising an aliphatic thermoplastic polyurethane elastomer, the polymer composition further containing at least one hindered amine light stabilizer, an ultraviolet light absorber, and a coupling agent, the coupling agent comprising an isocyanate coupling agent, the polymer composition further containing a coloring agent sufficient for a molded article made from the composition to exhibit a color, the color having an L* value of greater than 25, the polymer composition exhibiting a color difference value (DEcmc) of less than about eight after exposure to five cycles of 280 kJ/m$^2$ irradiation per cycle in a xenon arc weatherometer operated according to Volkswagen Test PV 1303, wherein the ultraviolet light absorber comprises a benzotriazole, the impact modifier being present in the polymer composition in an amount from about 5% to about 45% by weight, the polymer composition has a Charpy notched impact strength of at least about 3 kJ/m$^2$ and less than about 25 kJ/m$^2$ at −30° C. according to ISO Test 179/1eA and has an impact strength of at least 10 kJ/m$^2$ at 23° C., and wherein the polymer composition further comprises a sterically hindered phenolic antioxidant and wherein the hindered amine light stabilizer comprises Bis(1,2,2,6,6-pentamethyl-4-piperidinyl)-[[3,5-bis(1,1-dimethylethyl)-4-hydroxyphenyl]methyl] butylmalonate, the polymer composition having a formaldehyde emission of less than 7 mg/kg when tested according to VDA 275.

17. A molded article produced from a polymer composition comprising a polyoxymethylene polymer, an impact modifier, a coupling agent, and a coloring agent sufficient for the molded article to exhibit a color, the polyoxymethylene polymer being present in the polymer composition in an amount of at least about 40% by weight, the polyoxymethylene polymer containing terminal hydroxyl groups in an amount of at least 15 mmol/kg and less than about 10% by weight of constituents having a molecular weight below about 10,000 Dalton, wherein the impact modifier comprises an aliphatic impact modifier and the coupling agent comprises an aliphatic coupling agent, the polymer composition exhibiting a color difference value (DEcmc) of less than about eight after exposure to five cycles of 280 kJ/m$^2$ irradiation per cycle in a xenon arc weatherometer operated according to Volkswagen Test PV 1303, the coupling agent comprising an isocyanate, the coupling agent couples the impact modifier to the polyoxymethylene polymer, the coupling agent comprising isophorone diisocyanate trimer, the coupling agent being present in the composition in an amount of 0.3% by weight or less, the polymer composition having a formaldehyde emission of less than 7 mg/kg when tested according to VDA 275 and a Charpy notched impact strength of from about 3 kJ/m$^2$ to about 25 kJ/m$^2$ at −30° C. according to ISO Test 179/1eA.

18. An article as defined in claim 17, wherein the article has been formed through injection molding.

19. An article as defined in claim 17, wherein the article comprises an automotive part configured to be located within an interior of a vehicle.

20. An article as defined in claim 19, wherein the automotive part comprises a trim bezel or a handle or is part of a safety restraint.

21. An article as defined in claim 17, wherein the article comprises a clip or a fastener.

22. A process for producing a molded article comprising:
heating and injecting a polymer composition into a mold to form a molded article, the polymer composition comprising a polyoxymethylene polymer, an impact modifier, a coupling agent, and a colorant, the polyoxymethylene polymer being present in the polymer composition in an amount of at least about 40% by weight, the polyoxymethylene polymer containing terminal hydroxyl groups in an amount of at least 15 mmol/kg and less than about 10% by weight of constituents having a molecular weight below about 10,000 Dalton, the impact modifier being present in the polymer composition in an amount from about 5% to about 40% by weight, the impact modifier being blended with the polyoxymethylene polymer and comprising an aliphatic thermoplastic polyurethane elastomer, the coupling agent comprising an aliphatic isocyanate, the molded article exhibiting a color difference value (DEcmc) of less than about eight and a gray scale value of at least about 3 after exposure to five cycles of 280 kJ/m$^2$ irradiation per cycle in a xenon arc weatherometer operated according to Volkswagen Test PV 1303, the aliphatic isocyanate comprising isophorone diisocyanate trimer, the polymer composition having a formaldehyde emission of less than 7 mg/kg when tested according to VDA and a Charpy notched impacted strength of from about 3 kJ/m$^2$ to about 25 kJ/m$^2$ at −30° Q according to ISO Test 179/1eA.

* * * * *